(12) United States Patent
Kroener et al.

(10) Patent No.: US 8,876,214 B2
(45) Date of Patent: Nov. 4, 2014

(54) VEHICLE SEAT COMPRISING A PLURALITY OF STRUCTURAL OR RETAINING PARTS AS WELL AS A METHOD FOR PRODUCING STRUCTURAL OR RETAINING PARTS OF SUCH A VEHICLE SEAT

(75) Inventors: Gregor Kroener, Bischberg (DE); Sandra Kieser, Coburg (DE)

(73) Assignee: Brose Fahrzeugteile GmbH & Co Kommanditgesellschaft, Coburg, Coburg (DE)

( * ) Notice: Subject to any disclaimer, the term of this patent is extended or adjusted under 35 U.S.C. 154(b) by 389 days.

(21) Appl. No.: 13/132,430

(22) PCT Filed: Oct. 7, 2009

(86) PCT No.: PCT/EP2009/063021
§ 371 (c)(1),
(2), (4) Date: Aug. 4, 2011

(87) PCT Pub. No.: WO2010/063505
PCT Pub. Date: Jun. 10, 2010

(65) Prior Publication Data
US 2011/0278892 A1    Nov. 17, 2011

(30) Foreign Application Priority Data

Dec. 3, 2008 (DE) .......................... 10 2008 060 136
May 7, 2009 (DE) .......................... 10 2009 002 912

(51) Int. Cl.
*A47C 7/02* (2006.01)
*B23K 20/12* (2006.01)
*B60N 2/68* (2006.01)

(52) U.S. Cl.
CPC .............. *B60N 2/682* (2013.01); *B23K 20/122* (2013.01); *B23K 2203/20* (2013.01); *B23K 2203/18* (2013.01); *B23K 2201/006* (2013.01); *B23K 2203/10* (2013.01); *B23K 2203/04* (2013.01)
USPC ................. 297/452.18; 297/452.1; 297/463.2

(58) Field of Classification Search
CPC ............ B60N 2/44; B60N 2/68; B60N 2/682; B60N 2/686; B23K 20/12; B23K 20/1205; B23K 20/122
USPC ..................... 297/354.1, 452.1, 452.18, 463.2
See application file for complete search history.

(56) References Cited

U.S. PATENT DOCUMENTS

| 3,421,201 A | 1/1969 | Oberle et al. ................. 29/470.3 |
| 3,631,858 A | 1/1972 | Ersek ............................. 128/318 |

(Continued)

FOREIGN PATENT DOCUMENTS

| DE | 4337939 | 11/1993 |
| DE | 10127166 | 6/2001 |

(Continued)

OTHER PUBLICATIONS

German Search Report for DE10 2009 002 912.5; date stamped Oct. 13, 2009; 4 pages.
German International Search Report for PCT/EP2009/063021 filed Oct. 7, 2009; 9 pages.

*Primary Examiner* — Philip Gabler
(74) *Attorney, Agent, or Firm* — Westman, Champlin & Koehler, P.A.

(57) ABSTRACT

The invention relates to a vehicle seat and to a method for producing said vehicle seat, in particular for motor vehicles, comprising a plurality of structural or retaining parts which are joined together or to a further part in at least one joining region, the join being produced by friction welding in at least one of the joining regions.

31 Claims, 22 Drawing Sheets

(56) References Cited

U.S. PATENT DOCUMENTS

| | | | | |
|---|---|---|---|---|
| 6,505,890 B2* | 1/2003 | Riley et al. | | 297/452.2 |
| 6,582,831 B2* | 6/2003 | Ezumi et al. | | 428/598 |
| 6,739,673 B2* | 5/2004 | Gupta et al. | | 297/452.65 |
| 7,083,076 B2* | 8/2006 | Slattery | | 228/2.3 |
| 7,243,998 B2* | 7/2007 | Fourrey et al. | | 297/452.15 |
| 2002/0096932 A1* | 7/2002 | Fujita et al. | | 297/452.56 |
| 2003/0062759 A1 | 4/2003 | Gupta et al. | | 297/452.65 |
| 2005/0023880 A1 | 2/2005 | Fourrey et al. | | 297/452.18 |

FOREIGN PATENT DOCUMENTS

| | | |
|---|---|---|
| DE | 10055110 | 5/2002 |
| DE | 202007009701 | 1/2006 |
| DE | 102005015947 | 7/2006 |
| DE | 202007005182 | 9/2008 |
| EP | 1400302 | 3/2004 |
| EP | 1884318 | 2/2008 |
| WO | WO2008/131228 | 10/2008 |

* cited by examiner

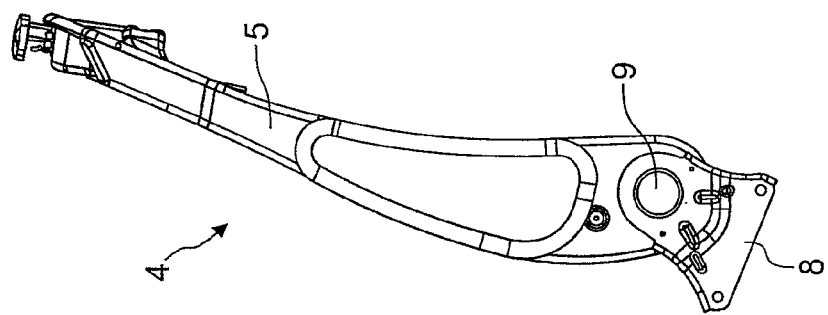
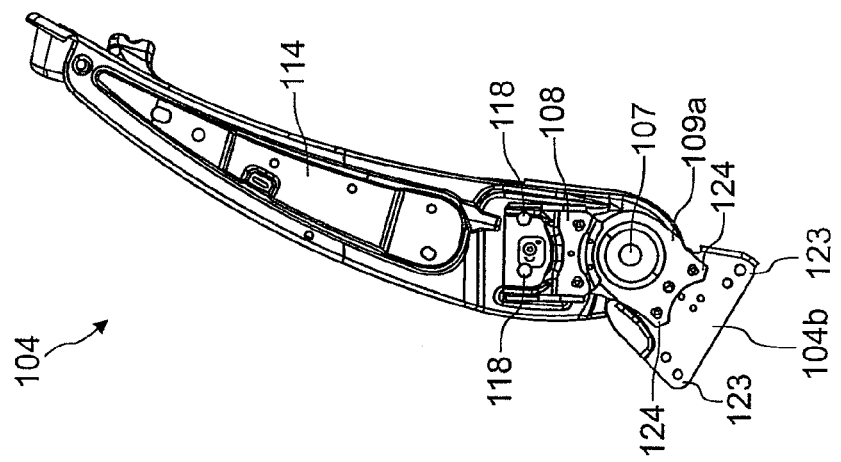

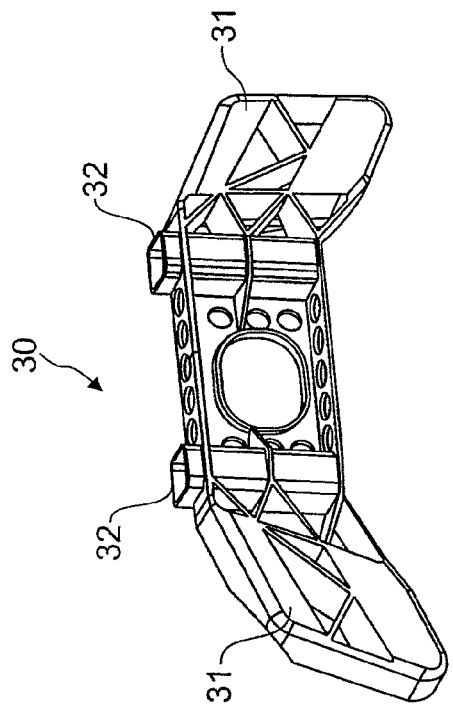
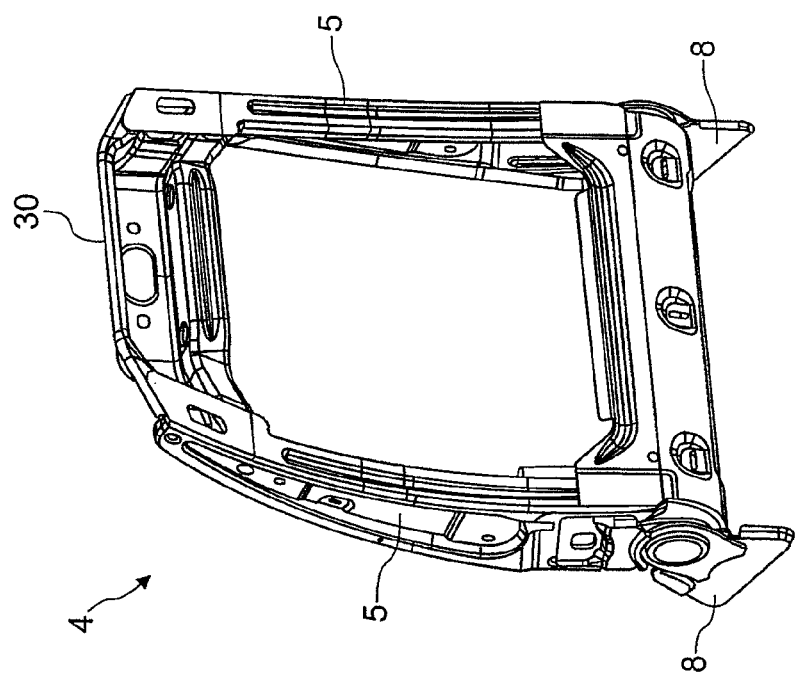
Fig. 7b
Fig. 7a

VEHICLE SEAT COMPRISING A PLURALITY OF STRUCTURAL OR RETAINING PARTS AS WELL AS A METHOD FOR PRODUCING STRUCTURAL OR RETAINING PARTS OF SUCH A VEHICLE SEAT

CROSS-REFERENCE TO RELATED APPLICATION

This Application is a Section 371 National Stage Application of International Application No. PCT/EP2009/063021, filed 7 Oct. 2009 and published as WO/2010/063505 on 10 Jun. 2010, in German, which claims the benefit of German patent application No. 10 2008 060 136.5, filed Dec. 3, 2008, and of German patent application No. 10 2009 002 912.5, filed May 7, 2009, the contents of which are incorporated herein by reference in their entirety.

FIELD OF THE INVENTION

The present invention relates to a vehicle seat, in particular for motor vehicles, comprising a plurality of structural or retaining parts, and also relates to a method for producing structural or retaining parts of such a vehicle seat.

BACKGROUND OF THE INVENTION

Known supporting structures of vehicle seats have structural or retaining parts which are stamped out of thin sheet steel and welded together. In the case of motor vehicle seats, identical material pairings are almost exclusively welded together, for example steel with steel. However, this increases the overall weight of vehicle seats, which is undesirable.

It is possible to reduce the overall weight of vehicle seats by using lighter materials. However, in this respect it should be noted that on the one hand, structures of vehicle seats are to comprise materials with a high weight-specific rigidity, strength and energy absorption to increase the safety of the occupants, while on the other hand lightweight materials are to be used to reduce the overall weight.

The different materials of such hybrid structures have to be joined together in a suitable manner. Adhesive bonding, riveting, screwing or clinch-riveting are known from the prior art as joining methods.

FIG. 1a is a schematic side view of a backrest frame 104 according to the prior art which comprises two backrest frame side parts 114, on the lower end of which a respective metal fitting 108 is attached for connection with a seat frame (not shown). According to FIG. 1a, the metal fitting comprises an upper connection part 109a fixed to the seat side part and a lower connection part 109b fixed to the seat side part which are connected together by screws or rivets 124. Holes 123 are provided in the lower connection part 109b fixed to the seat side part for connection with the seat frame (not shown) by screws or rivets. The upper end of the metal fitting 108 is connected to the backrest side part 114 by screws or rivets 118.

FIGS. 2a and 2b show a further backrest frame and a seat frame of a vehicle seat according to German Utility Model DE 20 2007 005 182 U1 of the Applicant. The two frame parts 104, 106 comprise an encircling supporting frame 110 which ensures the necessary stability for the vehicle seat. Provided in the connection region, i.e. in the lower region of the backrest frame 104 and in the rear region of the seat frame 106, is a respective crossbar 112 which interconnects in each case two edge side cheeks 114. The metal fitting 108 is provided to interconnect the two frame parts 104, 106. The seat frame 106 further comprises a rail guide 116 with an upper rail and a lower rail, which rail guide 116 is rigidly connected to the floor of the vehicle, it being possible for the upper rail to be moved in the lower rail to adjust the seat lengthways in the longitudinal direction (X-direction). The metal fittings 108 are preassembled on the backrest frame side cheeks 114 by screws or rivets 118. The holes 123 in the lower end of the metal fittings 108 are used to connect the metal fittings 108 to the seat frame 106 by screws or rivets. However, the connection portions provided for connection using screws or rivets must be relatively large since high-strength connection methods are required for crash optimisation. This increases the weight and the production costs of a vehicle seat. In addition, screwing or riveting is a relatively laborious procedure.

For joining two different metals, welding processes are also known from the prior art which are basically divided into welding processes which do not use pressure and welding processes which do use pressure. Examples of a welding process without pressure (fusion welding) are metal-active gas welding or laser welding known from the prior art. However, these welding processes are relatively complex and are often unsuitable where there is a lack of space.

EP 1 321 218 B1 discloses such a method for joining different types of connections of two different materials, namely aluminium or an aluminium alloy and steel or coated steel, using an electric arc under an inert gas atmosphere formed from a specific gas mixture.

EP 1 806 200 A1 discloses a method for joining an iron-based element to an aluminium-based element, in which a layer of zinc is applied to a joining surface of at least one of the elements to be joined to the other, which layer becomes plastic during welding in order to join the elements together. Resistance welding, laser welding, electron beam welding or arc welding are disclosed as welding processes.

For joining two different metals, welding processes which use pressure (pressure welding) are also known from the prior art, examples being seam welding, projection welding or spot welding. In these processes, the parts to be joined together are interconnected in a plastic but unmolten state. However, with the exception of ultrasound welding, these welding processes are not known in the vehicle seat sector.

In the following, examples are given of such methods for welding different material pairings, some of which are also used in motor vehicle construction.

WO 93/10935 discloses a method for joining parts by friction stir welding. EP 1 400 302 A1 and EP 1 884 308 A1 disclose further methods for friction stir welding.

EP 0 513 646 B1 discloses a method for joining blanks and construction parts made of steel to those made of aluminium in the production of turbines, the blanks or parts being joined together with the insertion of at least one transition layer made of a ductile subgroup metal and, to join parts made of steel to parts made of aluminium alloy, a pure nickel layer is applied to the steel by friction welding, the worked-off surface of the pure nickel layer is joined with the aluminium alloy by friction welding, or to join parts made of steel to parts made of titanium alloy, a copper layer is applied to the steel by friction welding and a vanadium layer is applied to the titanium alloy by friction welding and the machined copper and vanadium surfaces are joined together by friction welding.

DE 103 93 368 T5 discloses a laser roll welding method for different metals to join together a first metal sheet and a second metal sheet of different materials which are kept in a state of non-contact, in which method after only the first metal sheet has been heated by laser irradiation, a heated portion of the first metal sheet is pressed against the second metal sheet by a pressure welding roller so that they are brought into firm contact with one another and are subjected to plastic deformation, and a joining portion between the first metal sheet and the second metal sheet is cooled.

In the motor vehicle seat sector, laser welding, spot welding and projection welding are used as welding methods.

German Utility Model DE 20 2007 009 701 U1 discloses a structure of a vehicle seat, comprising at least two structural parts of different materials which are joined together in at least one contact point by means of ultrasound welding. At least one of the structural parts can consist of aluminium or of an aluminium alloy and the corresponding joining partner can consist of steel or, alternatively, at least one of the structural parts can consist of a fibre-reinforced plastics material and the corresponding joining partner can consist of aluminium, an aluminium alloy or steel. In the confined spaces encountered with vehicle seats, it is not always easy to connect adequate power via ultrasonic transducers. This can also increase the costs for a flexible production.

SUMMARY OF THE INVENTION

An object of the present invention is to provide an improved and in particular a more easily producible joining of structural and retaining parts for a vehicle seat, in particular for a car seat. A further object is to join together structural or retaining parts of the vehicle seat with different material pairings or to join them with other parts in a simple and cost-effective manner.

At least one of the objects mentioned is achieved by a vehicle seat and/or by a method of the present invention.

Thus, the invention provides:
a vehicle seat, in particular a motor vehicle seat, comprising a plurality of structural or retaining parts which are joined together in at least one joining region or are joined with a further part, the join being produced by friction welding in at least one of the joining regions.
A method for producing a vehicle seat, in particular a motor vehicle seat, comprising the steps: providing at least two structural or retaining parts for a vehicle seat; joining in each case two structural or retaining parts together or with a further part in at least one joining region, the join being produced by friction welding in at least one of the joining regions.

The basic concept of the invention is that the join is formed in at least one of the joining regions by friction welding which is explicitly not to be understood as ultrasonic welding within the meaning of the present application.

Consequently, it is possible to join different materials in a simple and cost-effective manner, for example aluminium/ aluminium alloys and steel and/or (glass) fibre-reinforced plastics materials. This allows hybrid structures, which are optimised in terms of load and weight, for motor vehicle seats, for which different materials are combined together.

Since a relatively small amount of heat is introduced in friction welding, there is little distortion of the parts to be joined which thus allows lower tolerances. Process monitoring is also relatively simple in friction welding, in particular the process parameters in friction welding, for example rubbing speed, rubbing frequency and rate as well as contact pressure can be preset in a very reproducible and constant manner.

Due to the fact that at least two of the retaining or structural parts consist of different materials and are joined together in at least one joining region by friction welding, a low-weight hybrid structure which has been produced in a cost-effective manner is provided which affords the necessary strength. In this respect, the materials can be aluminium/aluminium alloys on the one hand and steel, in particular high-strength steel, on the other. However, other materials are also possible, for example plastics materials reinforced with glass fibres or with other fibres, for example combined with one of the metals mentioned. It is possible for two or more retaining or structural parts to be joined together at the same time. It is also possible to join them simultaneously in a plurality of joining regions.

The structure is preferably the supporting structure of a backrest frame of a vehicle seat or the fitting of a backrest frame for joining the backrest frame with a seat frame, but it can also be the supporting structure of a seat frame. The base sheets and spars are preferably joined together. According to the invention, side parts and crossbars of backrest or seat frames, for example, can also be joined together.

Advantageous embodiments and developments of the invention are provided in the subclaims and in the description combined with the figures of the drawings.

In a preferred embodiment, the join is produced in a least one of the joining regions by a relative movement of the structural or retaining parts to be joined together. The relative movement is produced by a reciprocating movement of the structural or retaining parts to be joined together, preferably within a plane, by rotating at least one of the structural or retaining parts to be joined together and/or by multi-orbital friction welding.

In an embodiment which is also particularly preferred, the join is produced in at least one of the joining regions by friction stir welding.

In a preferred embodiment, the join is provided for transferring torques between the structural or retaining parts to be joined together. The join is preferably produced close to the edge or close to the area of the greatest torque.

In one embodiment, the structural or retaining parts which have been joined together consist of different materials. In this case, preferably at least one of the structural or retaining parts consists of aluminium, an aluminium alloy or a magnesium alloy and the respective other joining partner consists of steel, in particular high-strength steel. It is also conceivable for at least one of the structural or retaining parts to consist of a fibre-reinforced plastics material and for the respective other joining partner to consist of aluminium, an aluminium alloy, a magnesium alloy or steel.

In one embodiment, the structural parts which have been joined together form the supporting structure of a backrest frame.

In a preferred embodiment, a respective backrest frame side part is joined in at least one of the joining regions with a fitting for coupling with a seat frame, or a respective seat frame side part is joined in at least one of the joining regions with a fitting for coupling with the backrest frame. Assembly aids are preferably provided on the backrest frame side part and on the fitting and they form a pair of assembly aids, engage positively in one another and are configured such that the backrest frame side part and the filling can be moved relative to one another over a predetermined distance to carry out a friction welding process and are located in a predetermined position relative to one another by a mutual stop of the assembly aids after the conclusion of a movement phase of the friction welding process which serves to heat the portions to be joined together. In this case, the assembly aids preferably engage in one another through a recess, it being possible for said recess to be configured as a slot, for example, and the other assembly aid can be configured as a cross pin.

In a preferred embodiment, a respective backrest frame side part is joined with an upper or a lower crossbar in at least one of the joining regions.

In a preferred embodiment, a respective seat frame side part is joined with a seat frame side angle in at least one of the joining regions and/or the seat frame side angle is joined with an upper rail of a vehicle seat longitudinal adjustment in at least one of the joining regions.

In a preferred embodiment, a connecting rod and lever elements which are attached to both sides and are attached to the connecting rod via respective connections are provided as structural parts which are joined together. In this respect, the connections provided on both sides of the connecting rod can be produced at the same time. In this case, the connecting rod is configured as a profiled tube with an inner profile, the inner profile also being welded to the respective lever element for joining the profiled tube with the respective lever element.

The profiled tube is preferably configured as an extruded aluminium tube or as an extruded tube made of an aluminium alloy.

In one embodiment, the join in at least one of the joining regions has a continuous welded seam, a regularly and/or irregularly interrupted welded seam or a plurality of punctiform welds.

In one embodiment, the join is produced in at least one of the joining regions with an outer cone and an inner cone.

In a preferred embodiment, in stir friction welding, a welding tool, in particular a mandrel-shaped pin is used which is arranged between the structural or retaining parts to be joined together to produce the join in the joining region and which performs a relative movement based on the structural or retaining parts, in particular a rotating relative movement.

In a preferred embodiment, a plurality of welding tools is used at the same time to produce the join.

The above-mentioned embodiments and developments of the vehicle seat according to the invention and the method according to the invention for the production of said vehicle seat can be combined together in any manner.

BRIEF DESCRIPTION OF THE DRAWINGS

In the following, the present invention will be described in more detail with reference to the embodiments indicated in the schematic figures of the drawings.

FIG. 1-2 is a schematic perspective view of an orbital friction welding process;

FIG. 1-3 is a schematic perspective view of a rotation friction welding process;

FIG. 1-4 is a schematic perspective view of a friction stir welding process;

FIG. 1a is a schematic side view of a backrest frame of a motor vehicle seat with a fitting according to the prior art;

FIG. 1b is a schematic side view of a backrest frame of a motor vehicle seat with a fitting according to the present invention;

FIG. 2b is a schematic perspective view of a seat frame according to the prior art for joining with the backrest frame according to FIG. 2a;

FIG. 3b is a schematic perspective view of a seat frame according to the present invention for joining with the backrest frame according to FIG. 3a;

FIG. 3c is a schematic perspective view of a preferred modification of the backrest frame according to FIG. 3a;

FIG. 4 is a partly perspective view of a detail of the seat frame according to FIG. 3b;

FIG. 7a is a schematic perspective view of a backrest frame according to a further embodiment of the present invention;

FIG. 7b is a schematic perspective view of a crossbar of the backrest frame according to FIG. 7a;

FIG. 9a is a perspective view of a backrest frame side part with a fitting plate to be attached;

FIG. 9b is a further perspective view of the backrest frame side part according to FIG. 9a;

FIG. 9c is an enlarged perspective partial view of the backrest frame side part according to FIG. 9a;

FIG. 10b is a further enlarged perspective partial view of the backrest frame side part according to FIG. 10a;

FIG. 13b is a further perspective view of the upper crossbar according to FIG. 13a.

In the figures of the drawings, identical and functionally identical elements, groups of elements and parts have been provided with the same reference numerals, unless indicated otherwise.

DETAILED DESCRIPTION OF THE DRAWINGS

In the following, with reference to FIG. 1-1 to 1-4, a description will firstly be provided of friction welding in general within the meaning of the present invention and specifically of orbital friction welding, rotation friction welding and stir friction welding and the characteristics thereof.

In friction welding within the meaning of the present invention, the two parts to be joined together are heated by a movement relative to one another under the effect of pressure, preferably vertically onto the contact surfaces. For this purpose, the two parts to be joined together can be moved in a reciprocating manner relative to one another along a line or a linear path or they can also be moved periodically along a closed linear path.

Figure 1:
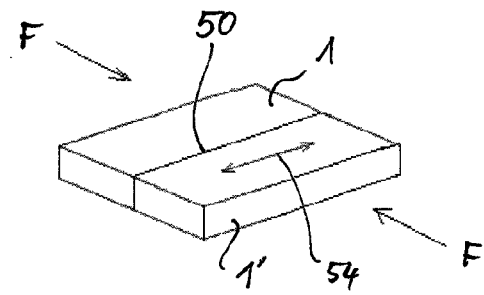
FIG. 1-1 is a schematic perspective view of a friction welding process.

A general example of such a friction welding process is shown schematically in FIG. 1-1. For example, here a structural part 1 and a retaining part 1' to be attached thereto rest against one another with a joining seam 50. Contact pressure forces F act on the arrangement. The retaining part 1' performs a reciprocating rubbing movement 54. It is also possible for both parts 1 and 1' to perform opposed rubbing movements 54.

Figures 1, 2:
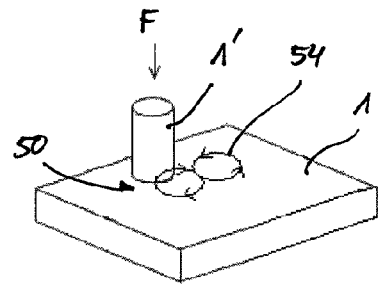

FIG. 1-2 shows what is known as an orbital friction welding process, in which the retaining part 1' (cylindrical in this case) is moved on the structural part 1 with the joining seam 50 in a figure-of-eight friction movement 54 under contact pressure force F. Other movement sequences are also possible and conceivable, for example the retaining part 1' can rotate at the same time.

Figures 1, 2, 3:
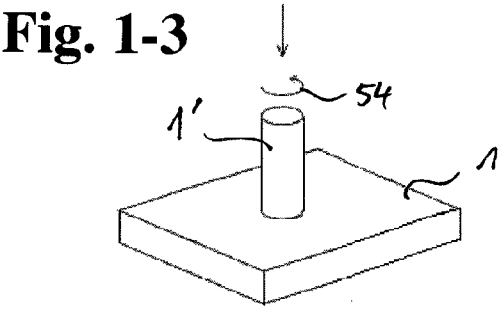
Figures 1, 2, 3, 4:
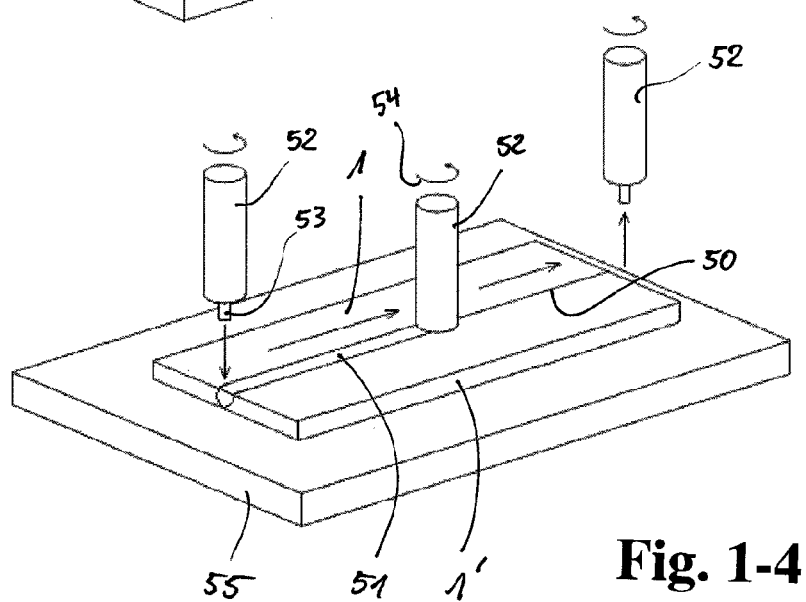

FIG. 1-3 shows what is known as a rotation friction welding process. The retaining part 1' is moved on the structural part 1 with a rotating rubbing movement 54 under contact pressure force F. Alternatively, the two parts 1 and 1' to be joined together can also be rotated relative to one another, which is advantageous in particular for joining a rotationally symmetrical tube, for example.

What is known as friction stir welding can also be understood as friction welding within the meaning of the present invention. This specific friction welding process is shown in FIG. 1-4, in which the two parts 1 and 1' to be joined together are firmly clamped in a suitable manner on a support 55 and rest against one another with the joining seam 50 in their joining region. A welding tool 52 in the form of a cylinder with a pin 53 arranged on the lower side coaxially with said cylinder rotates about its longitudinal axis, is lowered and pressed against the parts 1, 1' to be joined with the pin 53 at the beginning of the joining seam 50. As a result of the rotation and the developing friction, the material is heated on both sides of the joining seam 50 and becomes "doughy" to some extent, such that the welding tool 52 can be moved further in the direction of the joining seam 50 (arrows) while maintaining the rotation. The welded seam 51 forms behind the welding tool 52, this being indicated by the middle position of the welding tool 52. The shoulder of the welding tool 52 on the joining region with the pin 53 is guided lying on the joining seam 50. After the welded seam 51 has been produced over the entire length of the joining seam 50, the welding tool 52 is removed either vertically or horizontally.

It is also possible for a plurality of welding tools 52 and/or for other welding processes to be used at the same time, in which case the cycle time is considerably shortened.

Rotation friction welding and friction stir welding are particularly suitable for the production of seats in vehicle construction and for joining the associated components which are often formed as deep-drawn parts from different materials with beads, edges, borders, folded edges (in respect of strength, the effects of a crash, low weight) etc. Since the accessibility of suitable joining tools is generally very limited, also due to the complicated and expensive 3D configurations of the seat constructions and thus also of the retaining and structural parts thereof, these welding processes are particularly advantageous especially as they are also very reliable joining methods. The joining reliability itself, i.e. the reliability of the join even under an extreme load is, however, a very important criterion particularly in the seat sector. In an extreme case, it is possible for very high forces and torques to act on the corresponding joining regions. Nevertheless, the joining regions have to absorb this load. This is ensured by said friction-welded joints.

FIG. 1b is a schematic side view of a backrest frame 4 according to the present invention, on the backrest frame side cheeks 5 of which fittings 8 have been attached in a preassembled manner by friction welding, as described in the following. In the embodiment, the fitting 8 is configured in the manner of a separate adapter sheet. To join the fitting 8 with a seat frame, the holes shown in FIG. 1b, in the lower end of the fitting 8, can be used for receiving connection elements, such as screws or rivets. However, a friction-welding join is basically also possible here, as described in the following. The lower end of the fitting 8 can be directly connected to the seat frame without the conventional insertion of a lower connection part fixed to the seat side part (cf. reference numeral 109b according to FIG. 1a), thereby making further savings in terms of materials and cost.

Figure 2A:
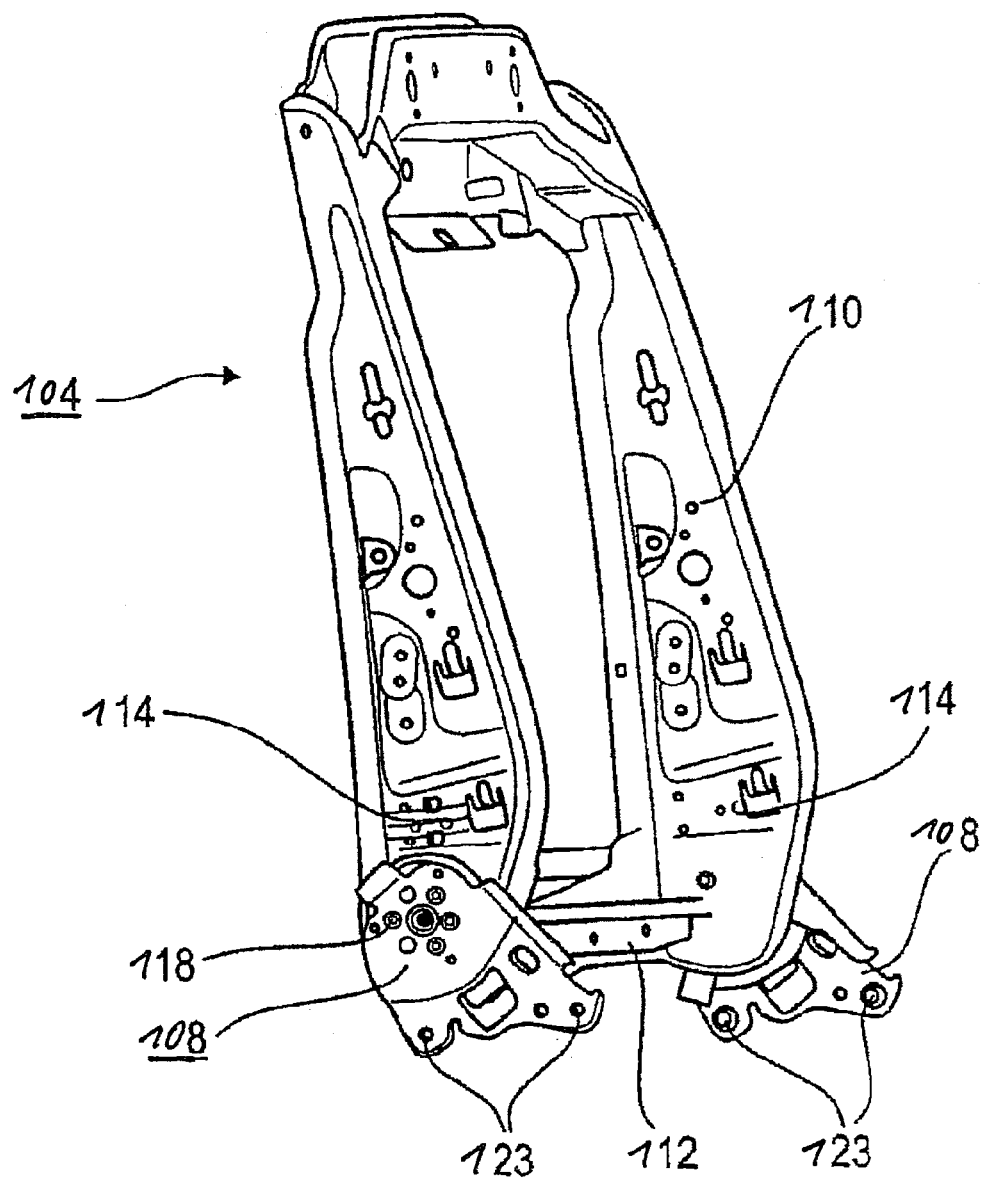
FIG. 2a is a schematic perspective view of a further backrest frame of a motor vehicle seat with a fitting according to the prior art.
Figure 2B:
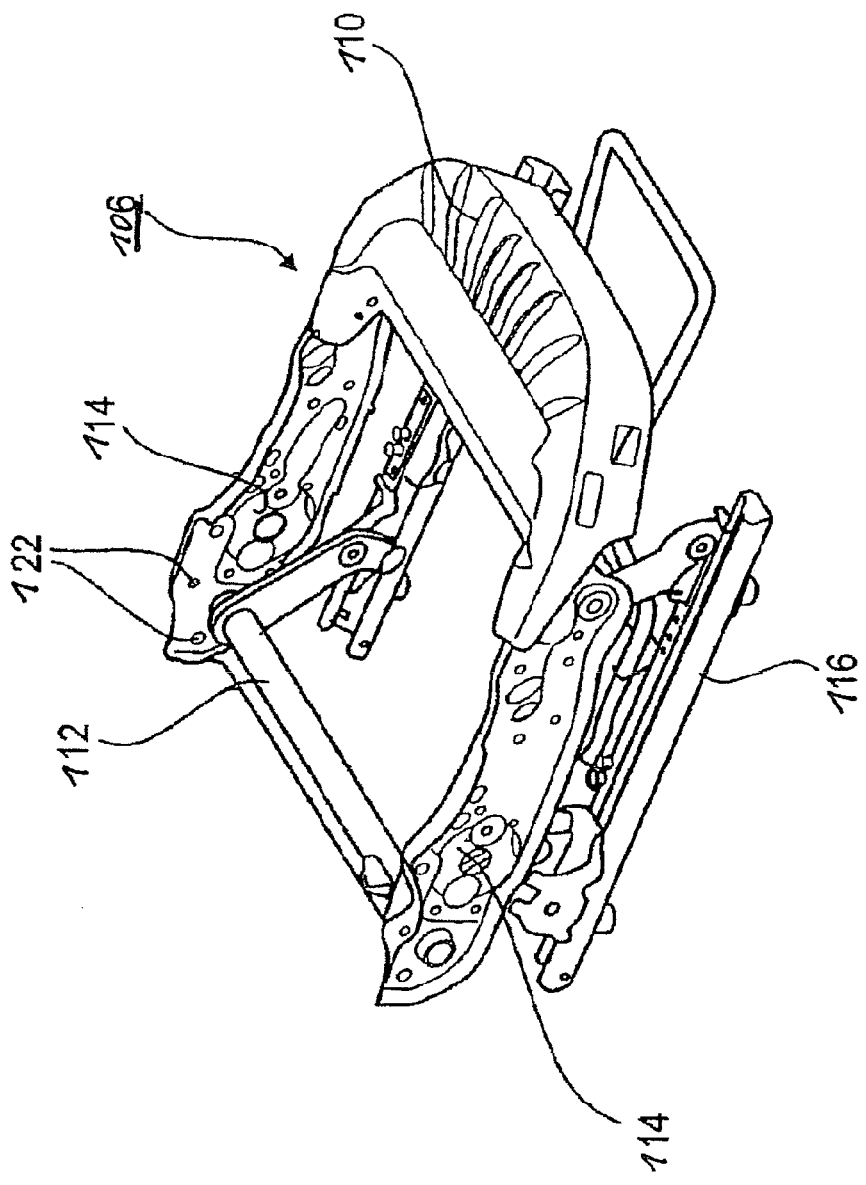
Figure 3A:
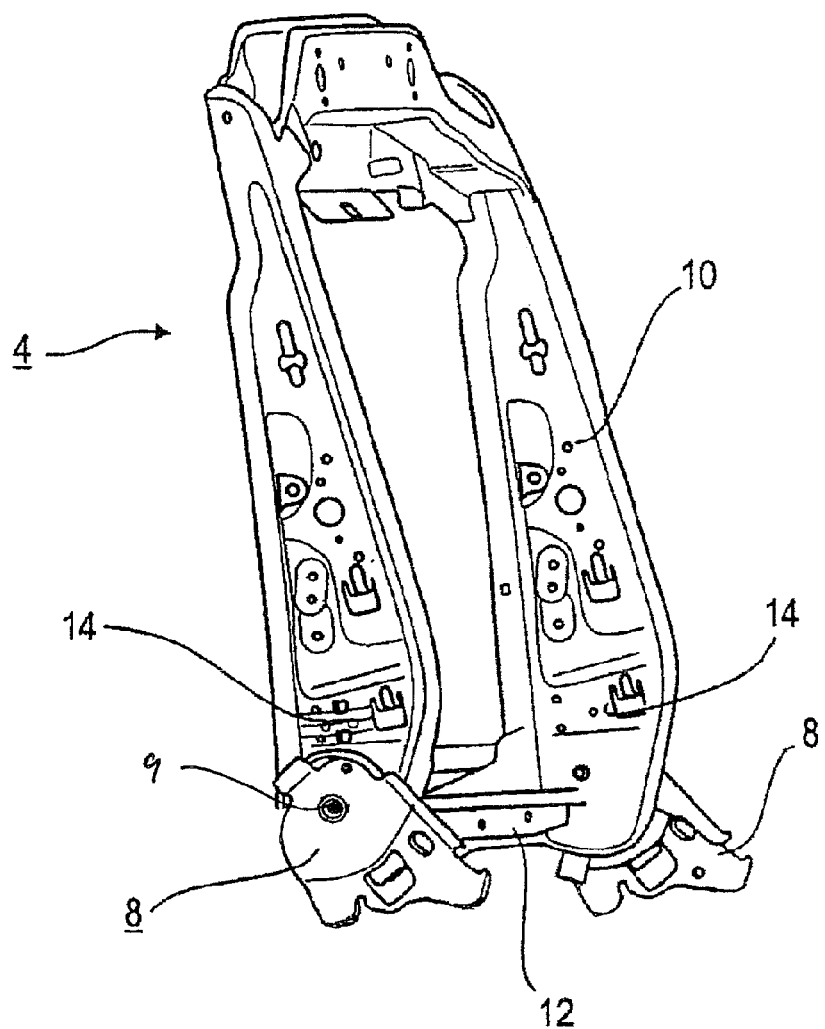
FIG. 3a is a schematic perspective view of a backrest frame of a motor vehicle seat with a fitting according to the present invention.
Figure 3B:
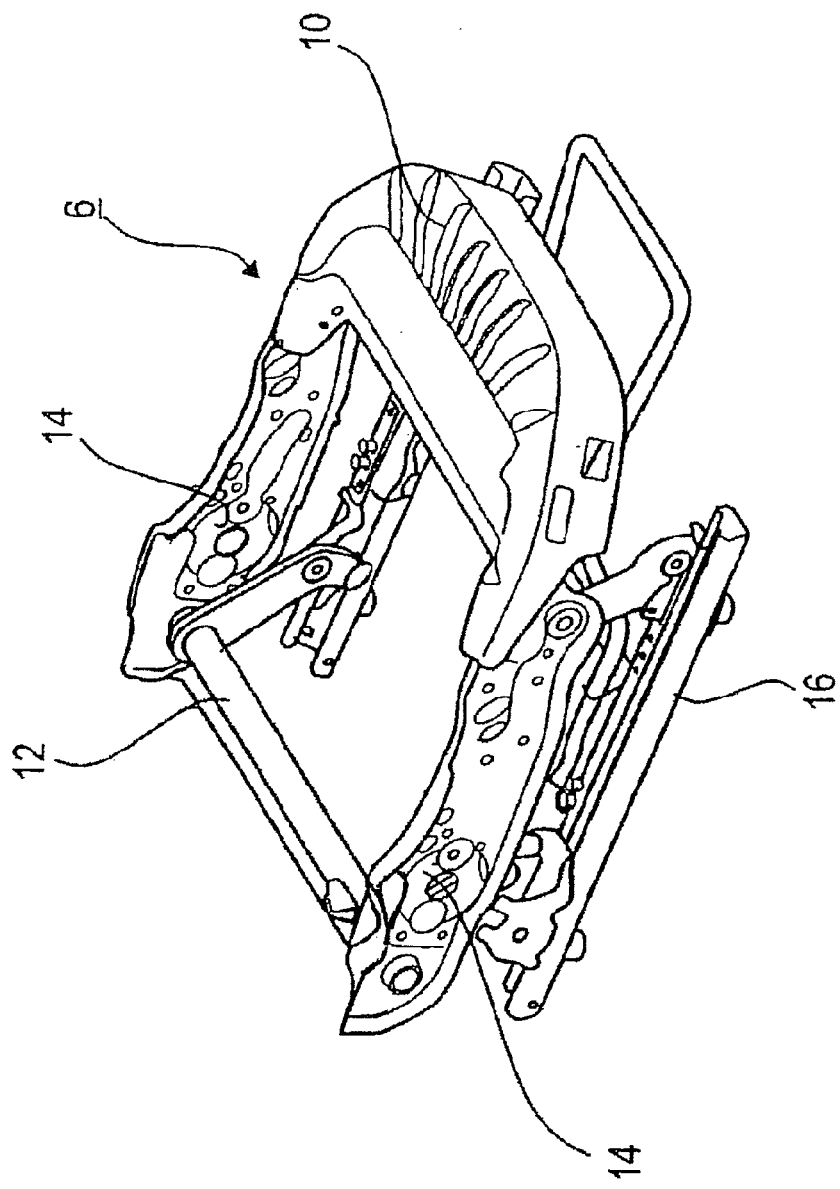

FIGS. 3a and 3b show details of a further vehicle seat according to the present invention. In direct comparison with FIG. 2a, it can be seen that in any event no holes are provided in the upper end of the fitting 8 for joining with the backrest frame side part 14 by means of screws or rivets. Therefore, according to the invention, the associated connection regions can be configured to be significantly smaller.

For joining by friction welding within the meaning of the present invention, the two parts to be joined together, for example the backrest frame side part and the fitting, are moved relative to one another vertically on the contact surfaces under the effect of pressure, in particular on a plane spanned by the contact surfaces. The ensuing friction results in a heating effect and eventually in a surface softening of the materials in the region of the contact surfaces which are rubbing against one another. At the end of the rubbing procedure, the two parts to be joined together are in a suitable position. They are then left to cool down vertically on the contact surfaces under high pressure.

The relative movement between the two parts to be joined together can be repeatedly performed along a line or a simple linear path as a reciprocating movement. According to further embodiments, for an even more uniform heating, the relative movement can also be repeatedly performed along a closed geometric curve, for example in a figure of eight (so-called multi-orbital friction welding). Alternatively, at least one of the parts to be joined together can also be rotated, which can imply a rotational symmetry.

To assemble the backrest frame 4 on the seat frame 6, the backrest frame 4 is positioned from above onto the seat frame 6 in approximately a vertical direction (Z-direction). The preassembled fittings 8 which are attached laterally to the backrest frame 4 are pushed laterally along the side cheeks 14 of the seat frame 6. As a result, the backrest frame 4 is guided and aligned relative to the seat frame 6 in the transverse direction (Y-direction). In this respect, the fittings 8 provide some simplification of assembly; in particular they guide the backrest frame 4 when positioned on the seat frame 6.

According to the present invention, the parts to be joined together can be positioned by means of an external setting jig or a clamping device for holding the parts to be joined together. This clamping device can be configured such that it can move simultaneously in order to perform the relative movement of the parts to be joined together for the heating thereof.

Figure 5:
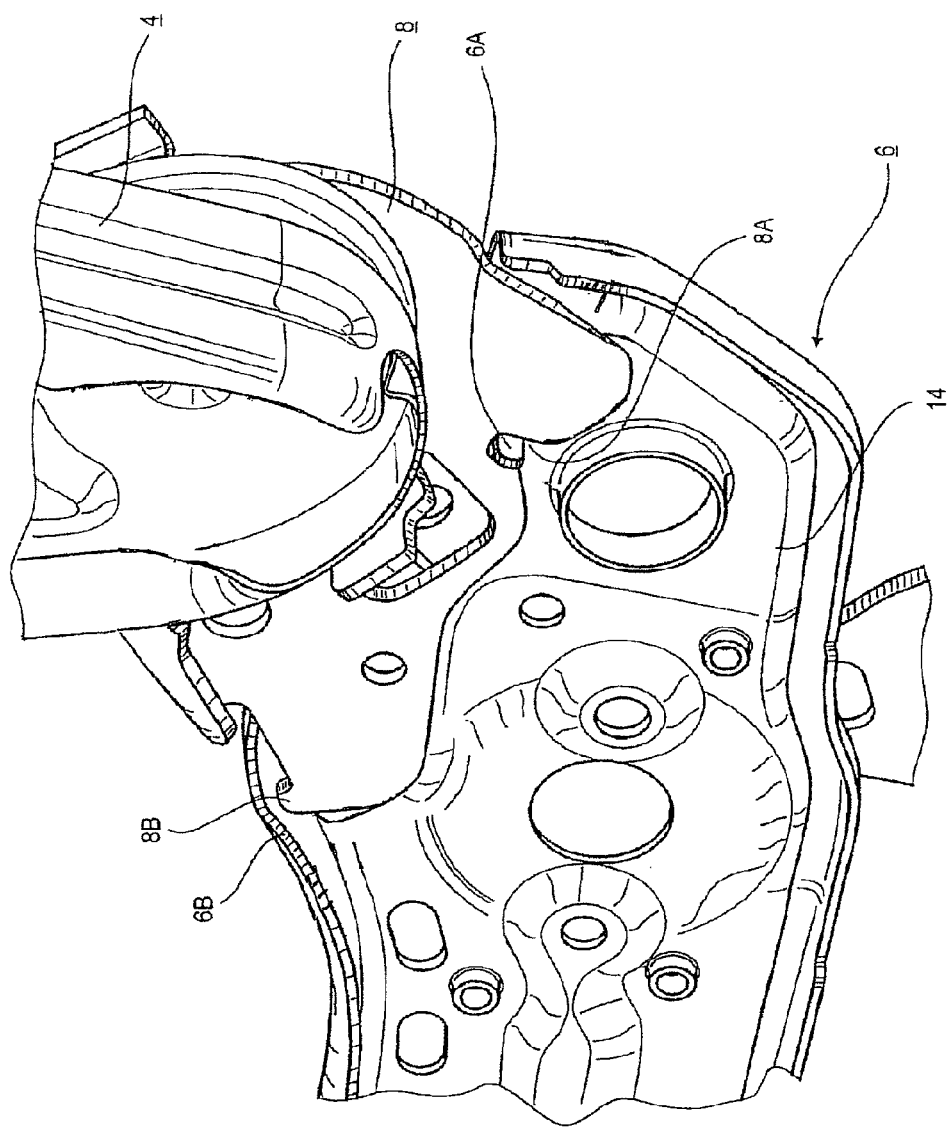
FIG. 5 is a partly perspective view of a detail of the seat frame according to FIG. 3b with the backrest frame according to FIG. 3a which are in an assembly aid position relative to one another.
Figure 6:
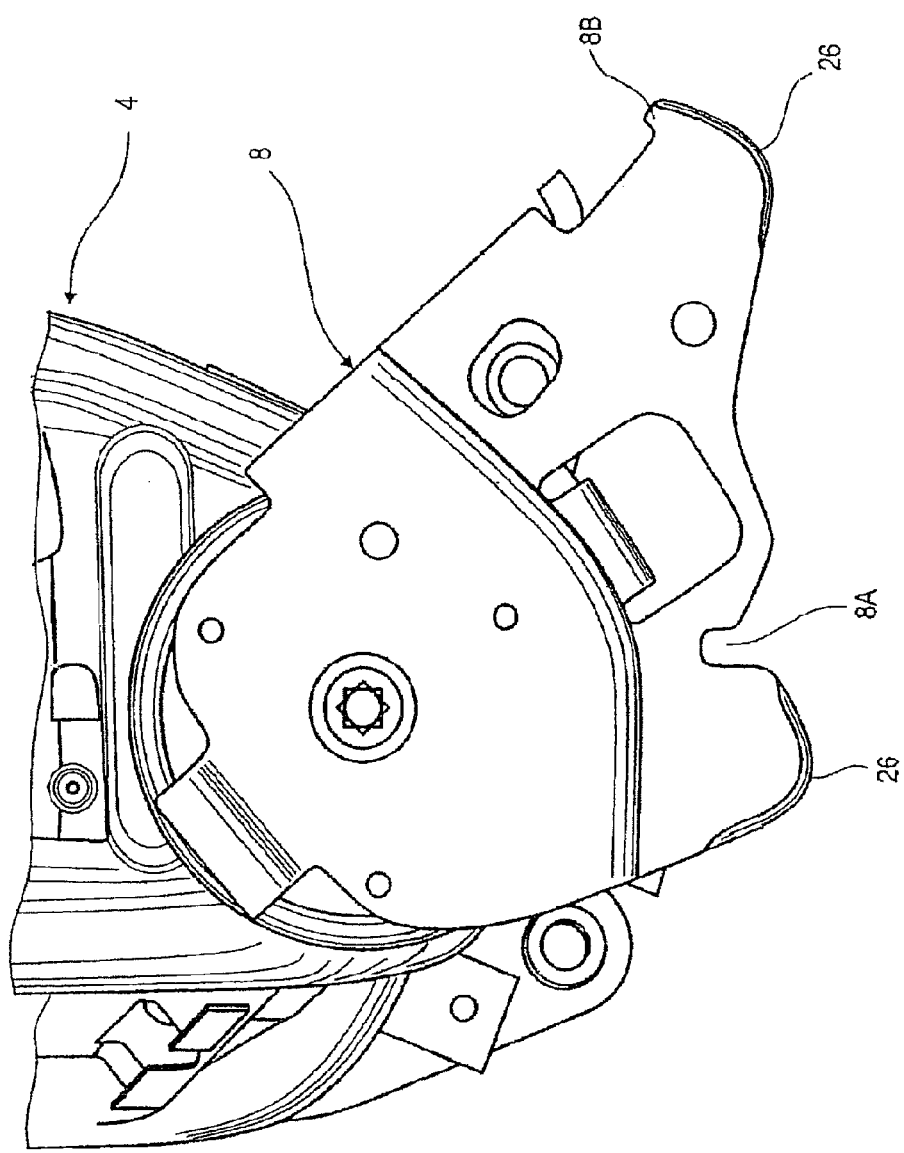
FIG. 6 is a detail view of the backrest frame according to FIG. 3a with the fitting with insertion bevels formed on the edges of the fitting.

To position parts to be joined together and to facilitate the assembly, as an alternative, positioning and assembly aids can also be provided in each case on the fitting 8 and on the seat frame 6. These positioning and assembly aids are constructive auxiliary elements which are configured in one piece on the fitting 8 and on the seat frame 6. In the following, the configuration and mode of operation of the assembly aids will be described in more detail with reference to FIGS. 4 to 6.

When the backrest frame 4 with the fitting 8 attached thereto is positioned on the seat frame 6, the two frame parts 4, 6 are automatically brought into the defined assembly aid position. The assembly aid position is such that the fitting 8 and seat frame 6 are suitably aligned with respect to one another, which suffices for a further joining procedure by friction welding, laser welding or the like. In embodiments in which the connection between fitting 8 and seat frame 6 is carried out using screws or rivets, the assembly aid position is such that holes in the fitting 8 are aligned with associated holes in the seat frame 6 so that a screw or rivet can be guided through the aligned holes.

A peripheral recess 8A and a peripheral lug 8B are provided on the fitting as positioning and assembly aids. These assembly aids 8A, 8B are formed in a cost-effective manner during the production process of the fitting 8, for example in a stamping process which establishes the outer contour of the fitting 8.

On the seat frame 6, the assembly aids are formed by a cross pin 6A and a transverse cover plate 6B. The cross pin 6A is formed by a tab which is curved out of the side cheek 14 in the transverse direction (Y-direction). In turn, the transverse cover plate 6B is formed by a peripheral folded edge of the side cheek 14. This folded edge is formed over wide parts of the side cheek 14 and is only interrupted in the region of the fitting 8. Thus, here it has a type of insertion opening for the fitting 8. The width of the insertion opening is adapted to the width of the fitting 8, such that the lug 8B engages behind the folded edge.

The peripheral recess 8A and the cross pin 6A as well as the lug 8B and the transverse cover plate 6B each form pairs of assembly aids 8A, 6A and 8B, 6B. These two pairs each act together and together form a positive interlocking. The peripheral recess 8A and the cross pin 6A provide a fixing of the backrest frame 4 relative to the seat frame 6 in both the Z and X-directions.

The additional pair of assembly aids, consisting of lug 8B and transverse cover plate 6B, serves as an anti-twist protection so that the backrest frame 4 does not rotate away backwards about an axis of rotation then defined by the cross pin 6A, due to its inherent weight. Thus overall, the assembly aids 8A, 6A; 8B, 6B ensure a reliable, form-locking fixing in the assembly aid position. Fixing in the Y-direction is achieved by the edge arrangement of the fitting 8. As can be seen in particular from FIGS. 5 and 6, the fitting 8 is arranged on the outside of the backrest frame 4 and is curved inwards with respect to its lower partial region oriented towards the seat frame 6, so that the fitting 8 rests against the inside of the side cheek 14 of the seat frame 6. To allow a simple insertion of the two opposing fittings 8 between the opposing side cheeks 14 of the seat frame 6, insertion bevels 26 are configured on the edge of the fitting 8 which are formed on the partial regions projecting approximately in the Z-direction and by which the fitting 8 is inserted. To form the insertion bevels 26, an encircling outer edge of the fitting 8 is bevelled at least in certain regions.

Assembly is carried out such that the backrest frame 4 is initially positioned from above onto the seat frame 6 approximately against the Z-direction. In this respect, a push-turn movement is provided, i.e. a push-in movement superimposed by a small turning movement. As a result, the fitting 8 is initially guided, leading with its lug 8B, under the folded edge, forming the transverse cover plate 6, of the seat frame 6, to form here a positive locking rear engagement. The peripheral recess 8A is then pushed or swivelled over the cross pin 6A. The cross pin 6A rests against the peripheral recess 8A and the lug 8B is supported on the lower side of the transverse cover plate 6B. Thus, by simply attaching the backrest frame 4, an assembly aid position is adopted in which the two frame parts 4, 6 are fixed in their positions relative to one another. This assembly aid position is maintained by the inherent weight of the backrest frame 4.

Figure 3C:
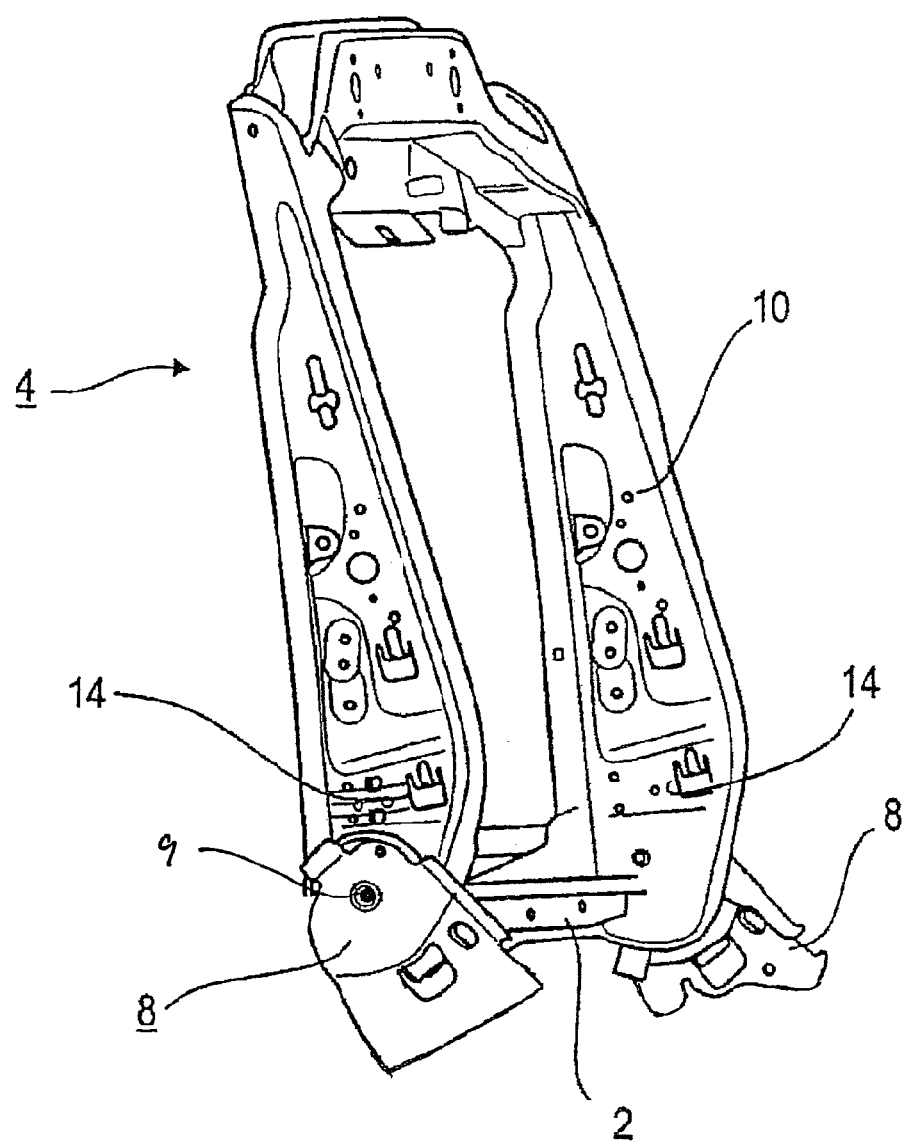
Figure 4:
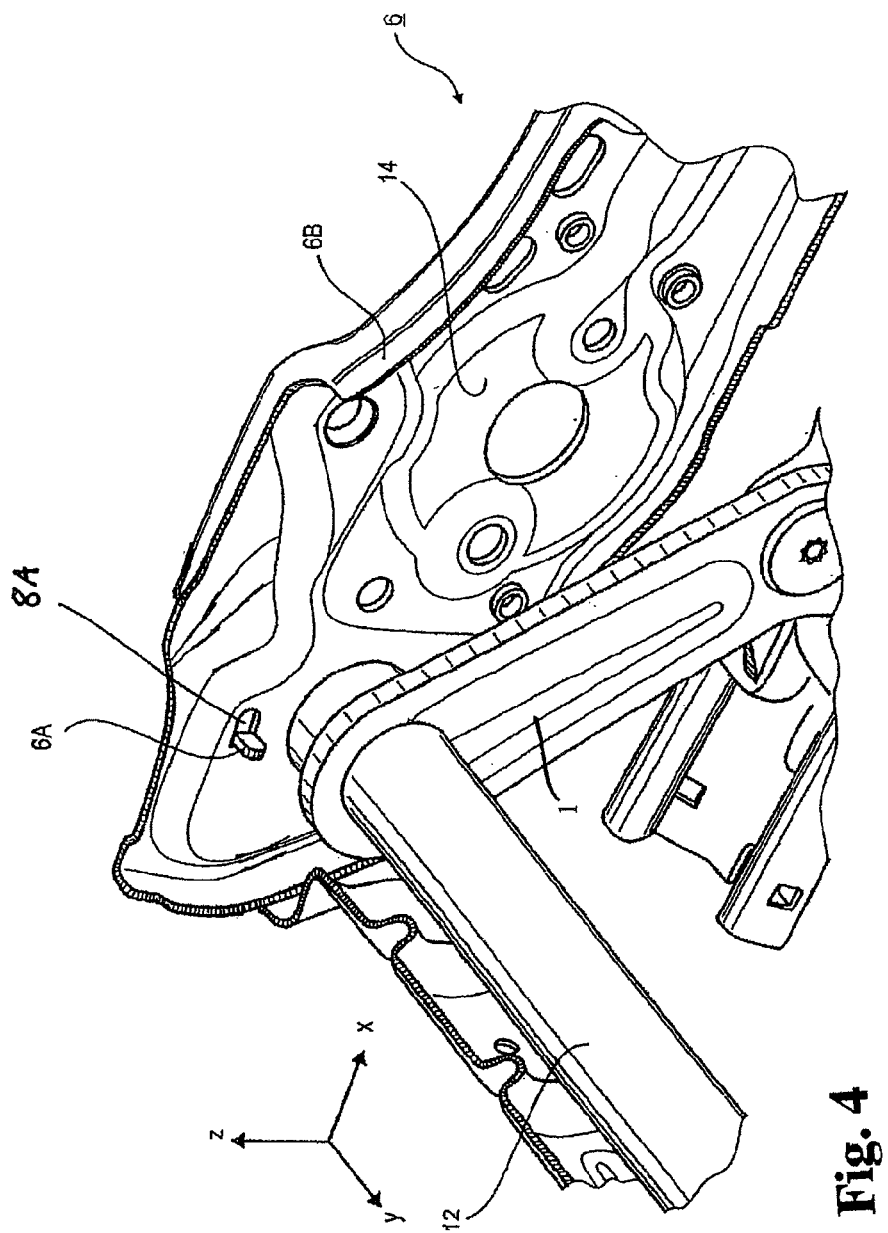

In embodiments in which the fitting 8 is connected to the seat frame 6 by screws or rivets, the further positioning of the parts to be joined together into the end position can be effected in the manner described in detail in DE 20 2007 005 182 U1 by the Applicant, the entire content of which is hereby explicitly included in this application by way of reference. In embodiments in which the positioning of the parts to be joined together into the end position is effected in another way, for example by means of an external setting jig or a clamping device, the additional assembly aid pair described above does not need to be provided, so that in particular the lower edge of the fitting 8 can be smooth, i.e. without recesses and projections, as shown by way of example in FIG. 3*c*.

In the following, further embodiments of joins by friction welding in the motor vehicle seat sector will be described with reference to FIGS. 7 and 8. According to FIG. 7*a*, in addition to the two fittings 8, the upper crossbar 30 which joins together the two backrest frame side parts 5, is joined with the backrest frame side parts 5 by friction welding. For this purpose, suitable planar joining regions are provided on the two side wings 31 (cf. FIG. 7*b*) of the upper crossbar 30, which regions are joined with associated and correspondingly configured joining regions on the inner surfaces of the two backrest frame side parts 5 under the effect of friction and pressure.

Figure 8:
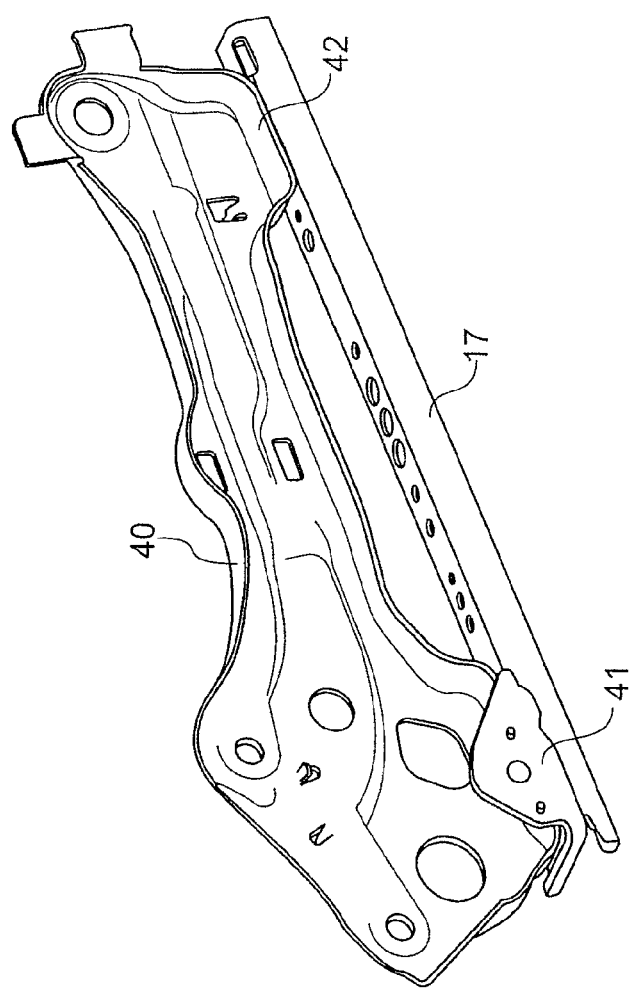
FIG. 8 is a schematic partially perspective view of a join according to the invention of a seat frame side part with an upper rail of a vehicle seat longitudinal adjustment.

FIG. 8 shows, as a further application of a join by friction welding, the join between a seat frame side angle 40, which is provided on the lower end of a seat frame, and an upper rail 17 of a rail guide for the longitudinal adjustment of a vehicle seat. The seat frame side angle 40 is joined with the upper rail 17 on the respectively level and planar supporting regions 41, 42 which are joined over their entire surface with the upper side of the upper rail. In this respect, the lower edge of the seat frame side angle 40 is folded over at a right angle, forming the two supporting regions 41, 42, so that the force can be introduced vertically onto the upper side of the upper rail 17 in a particularly effective manner for friction welding.

Figures 9A, 9B:
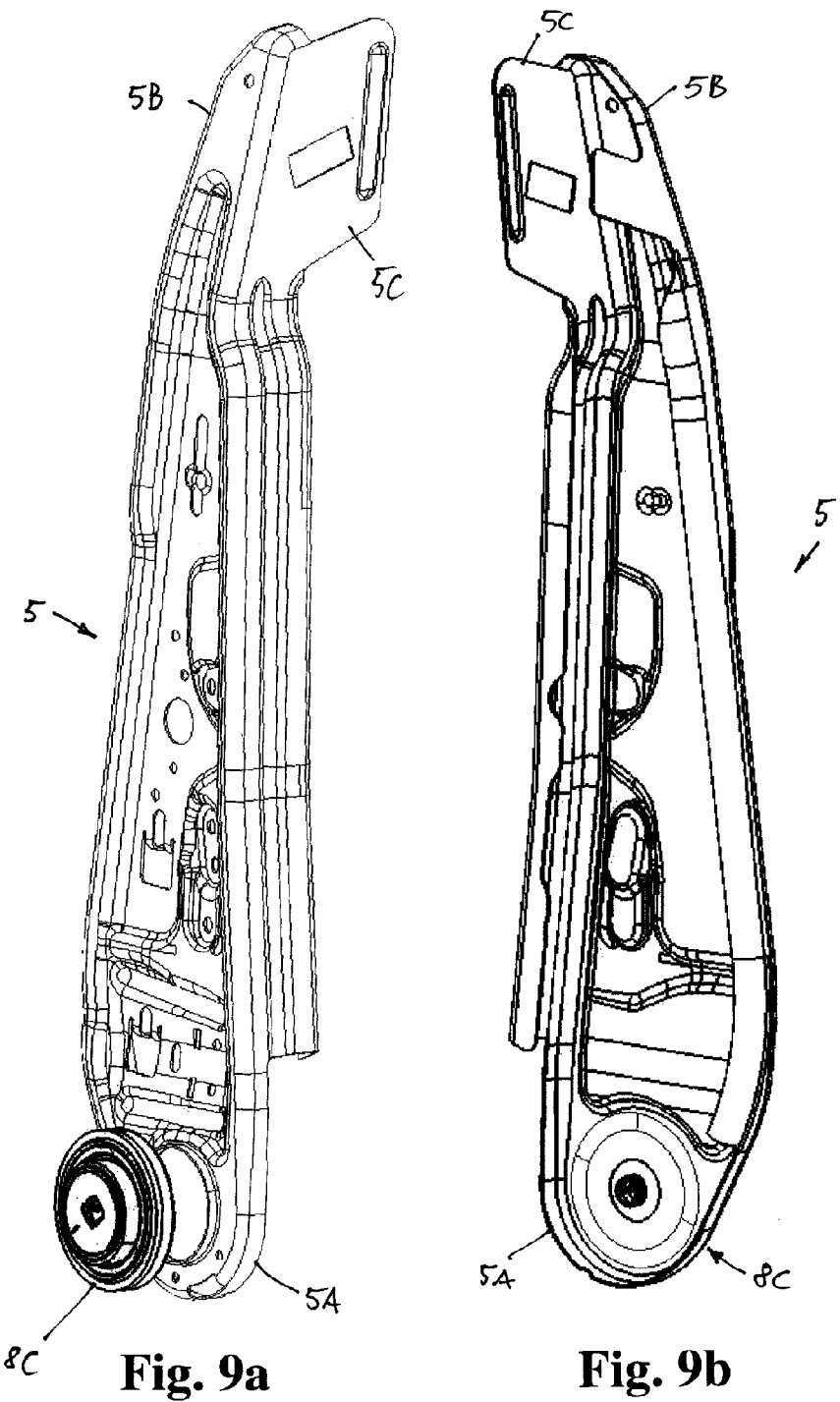

FIGS. 9*a* and 9*b* illustrate perspective views of a backrest frame side part 5 with a fitting plate 8C to be attached.

The backrest frame side part 5 (similar to FIG. 3*c*) has an underlying fitting portion 5A for attaching the fitting plate 8C and has an upper head 5B with a connection portion 5C for the upper crossbar 30 (see FIG. 7*a*) which will be described further below.

FIG. 9*a* shows the attachment side of the fitting plate 8C which is a rotationally symmetrical part and thus is suitable for a rotation friction welding process, as illustrated in FIGS. 1 to 3. FIG. 9*b* shows the backrest frame side part 5 from the rear relative to the attachment side of the fitting plate 8C.

Figure 9C:
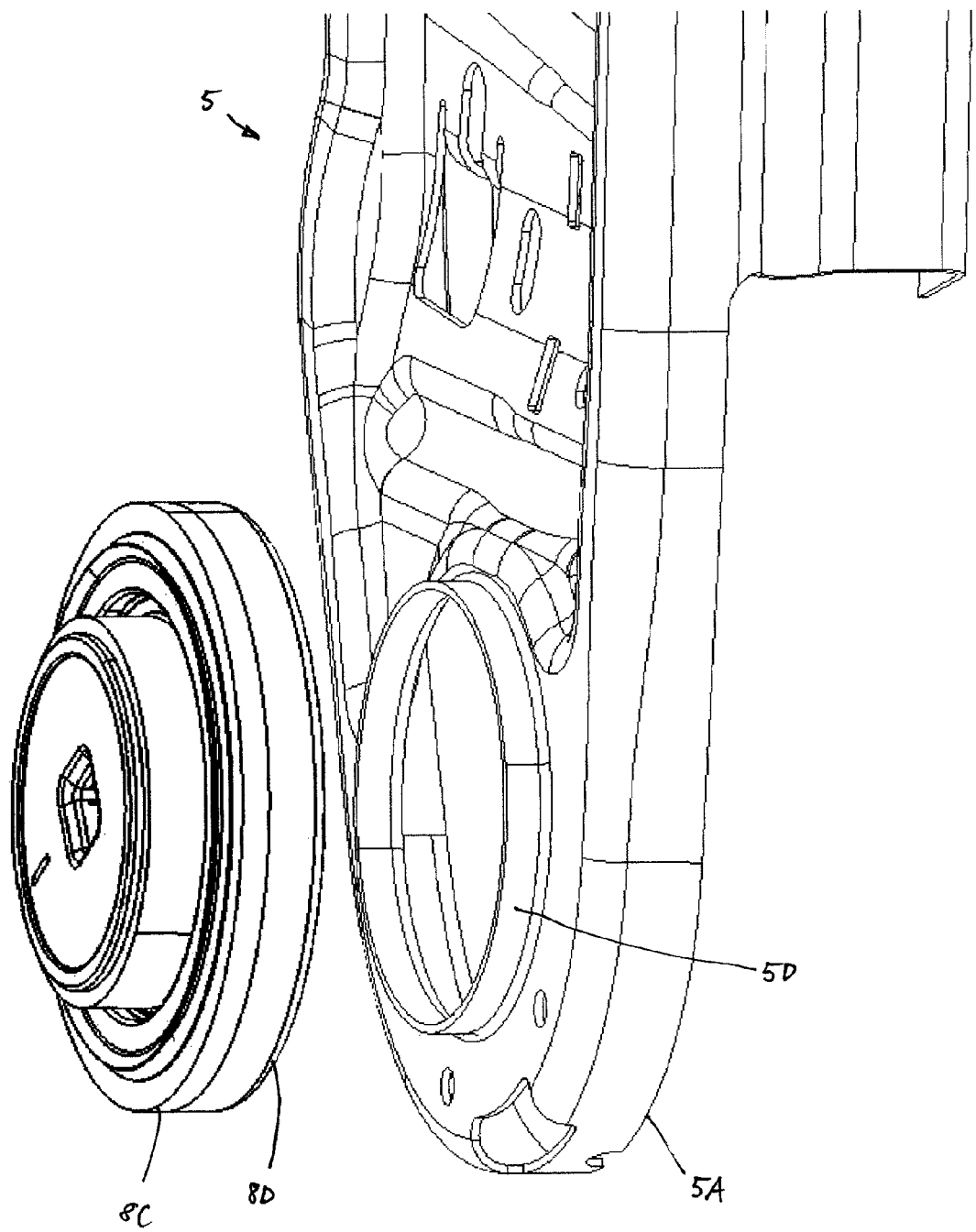
Figure 9D:
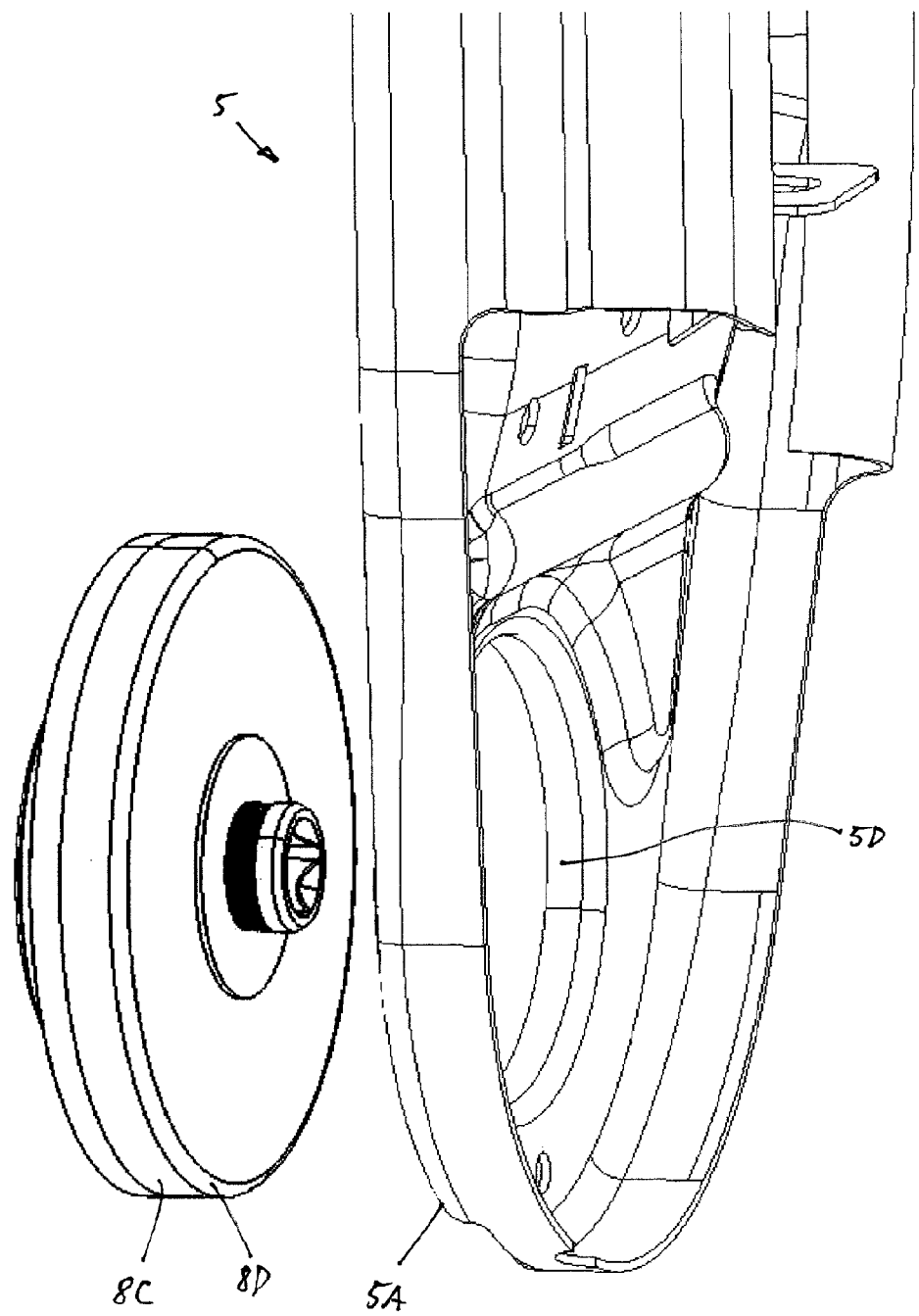
FIG. 9d is a further enlarged perspective partial view of the backrest frame side part according to FIG. 9c.
Figure 9E:
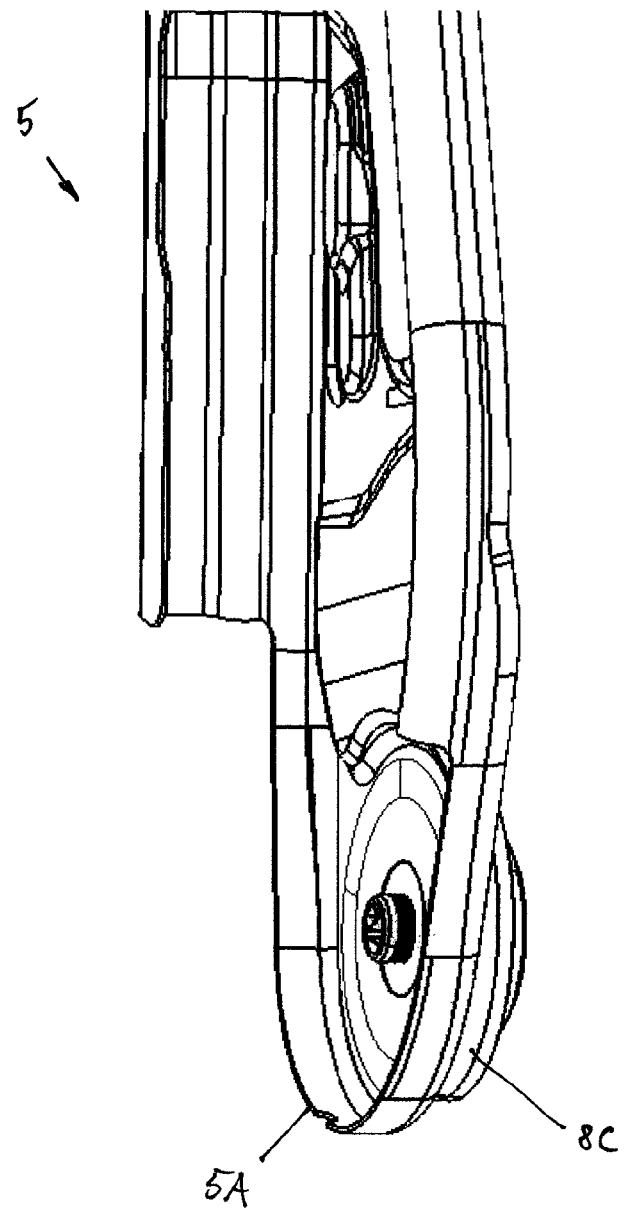
FIG. 9e is a further enlarged perspective partial view of the backrest frame side part according to FIG. 9b with an attached fitting plate.

In the event of an impact or crash of a vehicle (not shown) in which a seat has been installed with this backrest frame side part 5, the arising forces, in particular torques, have to be transferred into the fitting plate 8C to be attached. To overcome twisting moments and further forces, the backrest frame side part 5 is configured with corresponding beads, folded edges etc. This is shown in FIG. 9*c* in an enlarged perspective view. In the region of the fitting portion 5A, the backrest frame side part 5 has an opening with a projecting rim hole 5D which is welded to the lower side of the fitting plate 8C in a rotation friction welding process. For this, the fitting plate 8C is set into rotation and pressed onto the rim hole 5D with a pressing force on the fitting portion 5A. In so doing, the rim hole 5D is joined with the fitting plate 8C, preferably in the peripheral region thereof which is provided with a bevel 8D for this purpose. The bevel 8D and the planar lower side of the fitting plate 8C are clearly visible in FIG. 9*d*. The rim hole 5D is configured such that it forms a join which is as close to the edge as possible with the fitting plate 8C during welding. FIG. 9e shows the welded-on fitting plate 8C from the back.

In an alternative embodiment, the fitting plate 8C can also be attached to the fitting portion 5A of the backrest frame side part 5 by a stir friction welding process similarly to the illustration in FIGS. 1 to 4. For this purpose, the welding tool 52 can be guided in a circle around the periphery of the fitting plate 8C. It is also possible for the fitting plate 8C to be welded only in partial regions. The welded seams can also be produced in a punctiform manner (this applies to all friction stir welding processes on structural and retaining parts described here). The partial or punctiform friction welds are determined by the force path and/or the strength characteristics to be produced of previously established portions of the backrest frame side part 5 and of the corresponding structural and retaining parts.

The fitting plate 8C (representative here of all retaining parts) can also reinforce the fitting portion 5A (representative here of all structural parts).

Figure 10A:
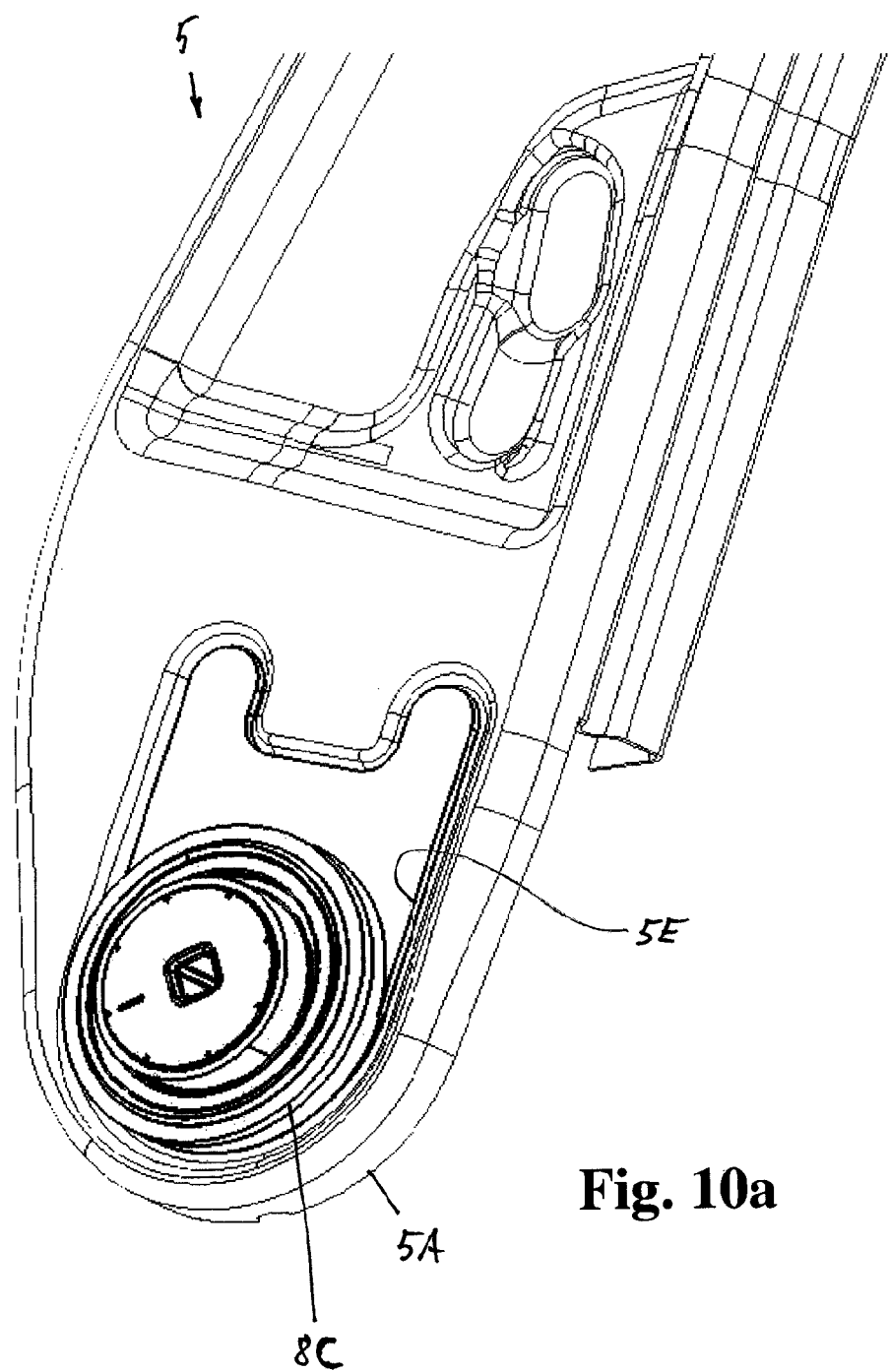
FIG. 10a is an enlarged perspective partial view of a further backrest frame side part with an attached fitting plate.
Figure 10B:
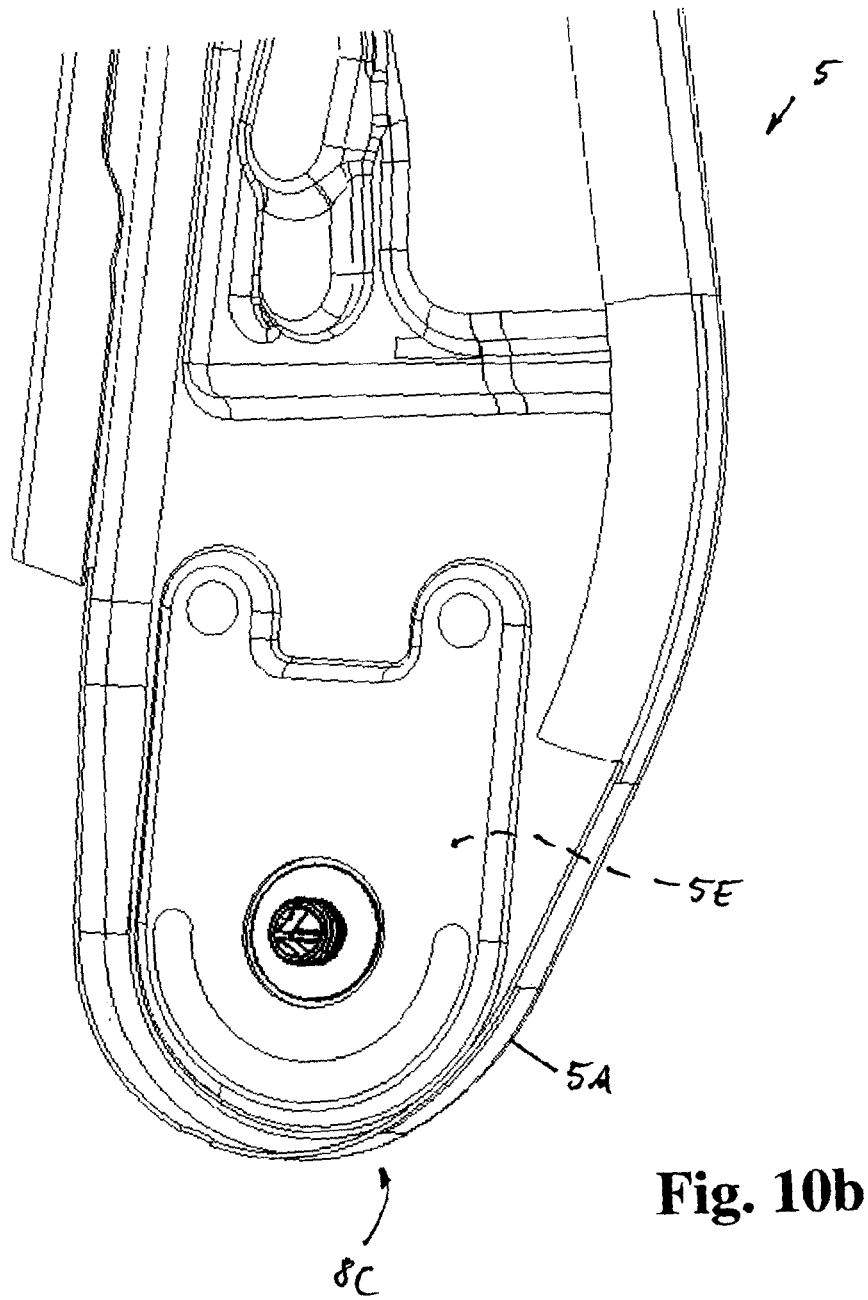

FIG. 10a is an enlarged perspective partial view of a further backrest frame side part 5 with a fitted fitting plate 8C and FIG. 10b is a rear view thereof.

In this variation, the fitting portion 5A of the backrest frame side part 5 has a worked-in seat 5E which is adapted in its lower region to the outer contour of the fitting plate 8C, whereas it is configured differently in the upper region. In this example, friction welding is carried out in the region adapted to the fitting plate 8C. This can be performed from above (FIG. 10a) or from the rear (FIG. 10b) or on both sides. It is also possible for a torque to be transferred not via the welded seam, but via a positive interlocking between the fitting plate 8C and a corresponding wall of the seat 5E. For this purpose, the positive interlocking can be provided by a suitable (e.g. non-circular) profiling. As a result, stabilisation of the backrest frame side part 5 is also possible.

Figure 11:
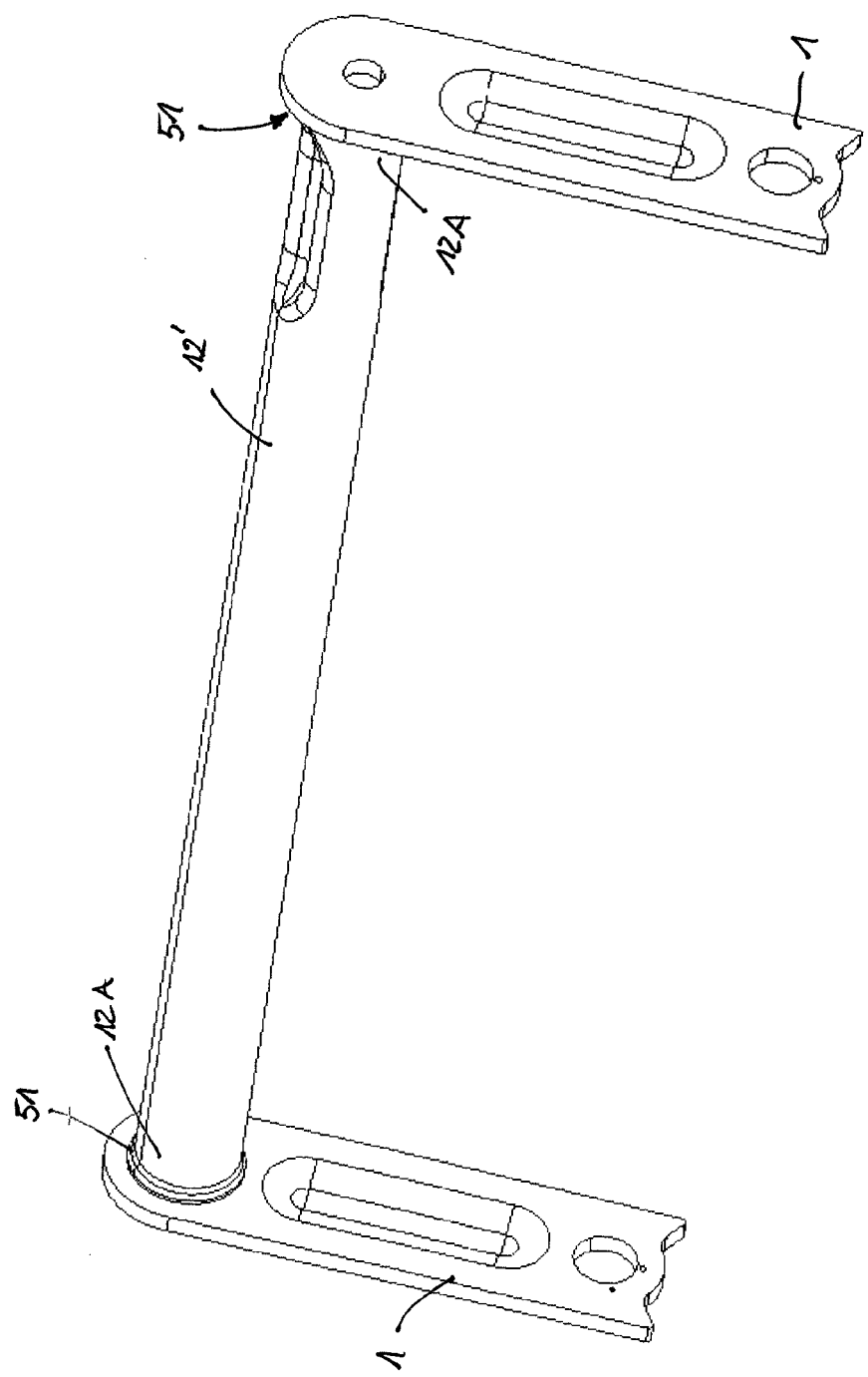
FIG. 11 is a perspective partial view of a crossbar.

FIG. 11 is a perspective partial view of a crossbar 12' which is provided at each end with an attachment portion 12A. Each attachment portion 12A is joined with a structural component 1, here for example side parts of a seat frame, by a welded seam 51 produced in a friction welding process. The friction welding process can be a revolving friction stir welding process or a rotation friction welding process. In rotation friction welding, the crossbar 12' is preferably rotated and simultaneously welded to the structural parts 1 on both attachment portions 12A. This is particularly advantageous, because otherwise in the case of a structural part 1 which has already been welded on, during a subsequent rotation friction welding process for welding onto the second structural part 1, the crossbar 12' would rotate with an imbalance.

Figure 12A:
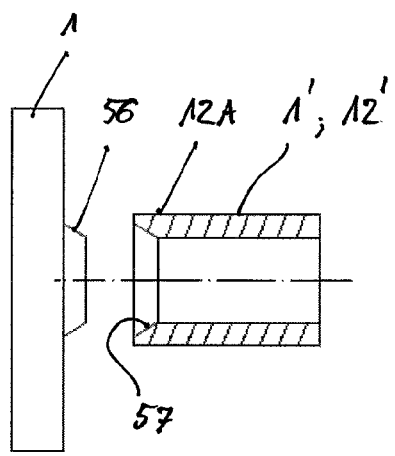
FIG. 12a is a schematic partial sectional view of an attachment portion.

FIG. 12a is a schematic partial sectional view of an attachment portion 12A of a retaining part 1' generally or of the crossbar 12', which here are rotationally symmetrical. For attachment purposes, the structural part 1 has an outer cone 56 and the retaining part 1' has an inner cone which corresponds therewith, as a result of which the friction surfaces and thus the welded seams are enlarged.

Figure 12B:
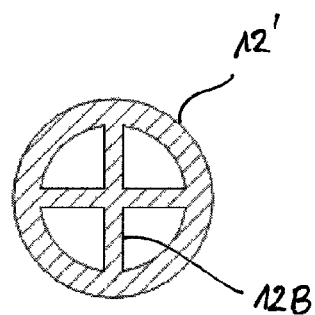
FIG. 12b is a sectional view of a profiled tube with an inner profile.

Furthermore, it is possible for the retaining part 1' and the crossbar 12' to be configured as profiled tubes. This is possible, for example, in the form of extruded aluminium profiled parts. Particularly advantageous are tubes with an inner profile 12B, as shown for example in FIG. 12b, in a rotation friction welding process, since in this case not only the outer casing but also the inner profile 12B is welded to the structural part 1, which is impossible in normal welding.

Figure 13A:
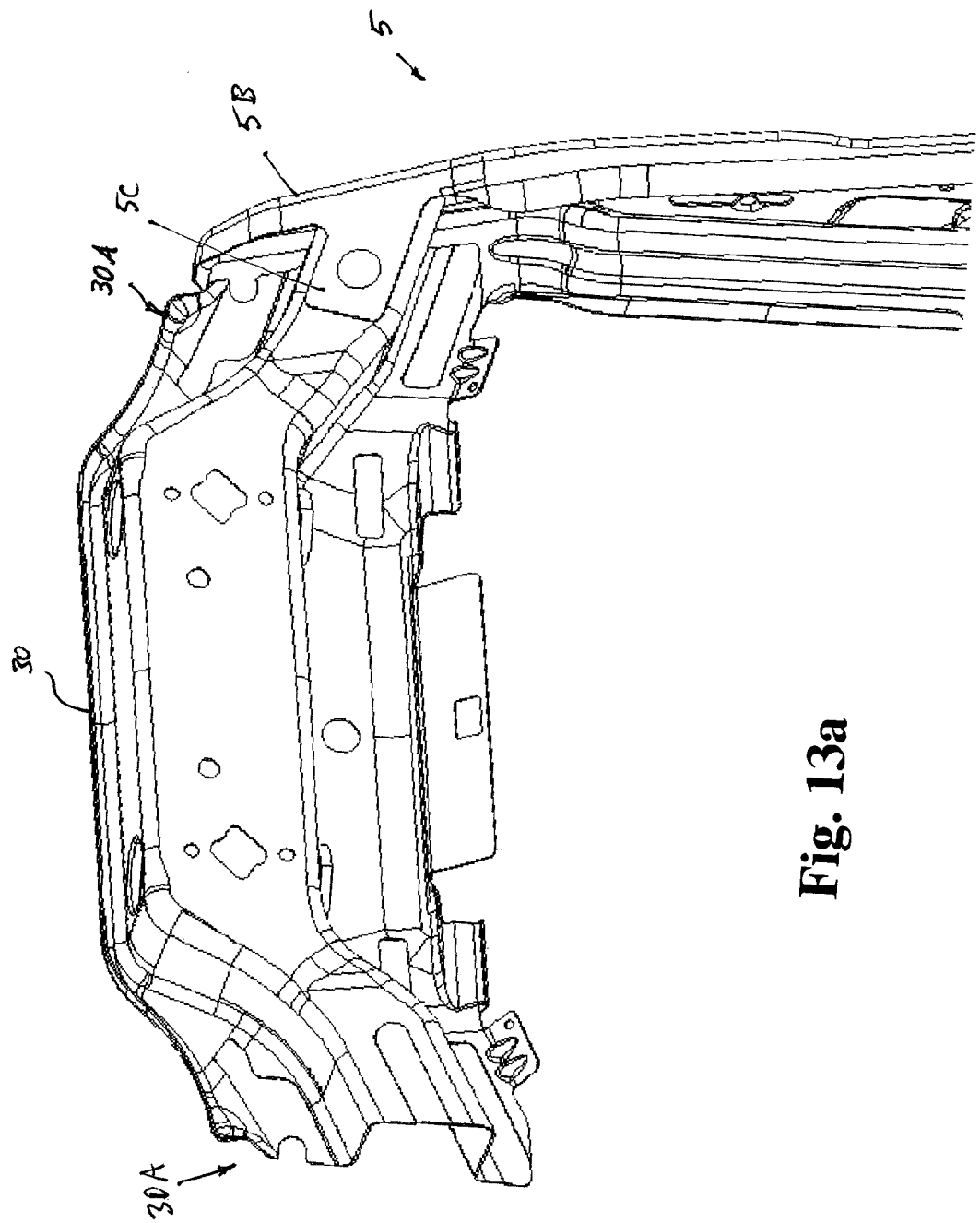
FIG. 13a is a perspective view of an upper crossbar.
Figure 13B:
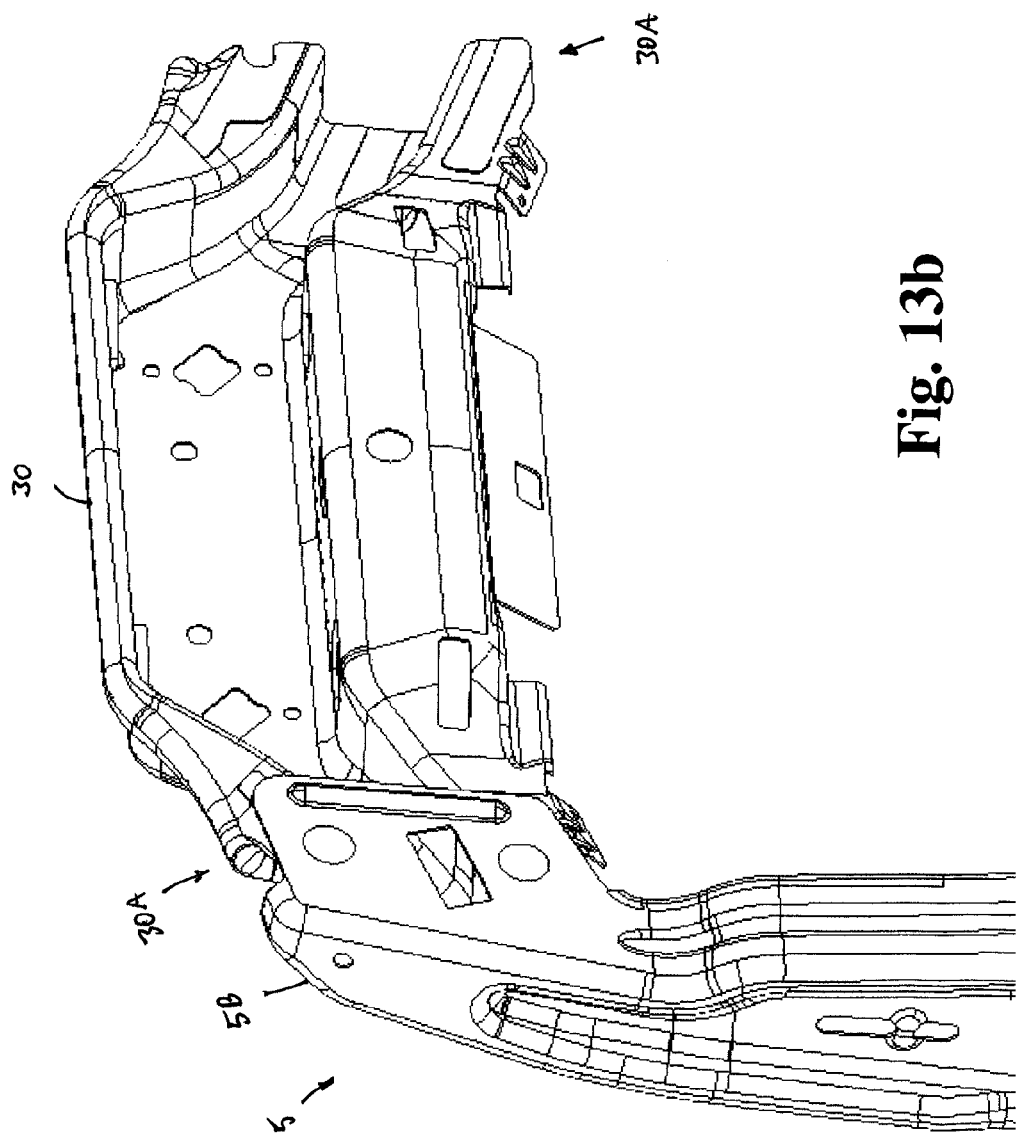

FIGS. 13a and 13b are perspective views of an upper crossbar 30 with joining portions 30A, where only one joining portion 30A is joined with a connection portion 5C of a head 5B of a backrest frame side part 5 by a friction welding process. In the example shown here, a respective joining portion 30A is welded in an overlapping manner to a connecting portion 5C by a friction stir welding process (FIGS. 1 to 4). However, friction welding according to FIG. 1-1 can also be possible.

The present invention is not restricted to the above embodiments but can be modified in any manner, without departing from the subject-matter of the present invention.

In particular, the friction welding process can be used to join any materials, and not necessarily the above-mentioned materials. According to the present application, friction welding allows in particular parts of different materials to be joined together. By way of example, the following material pairings are listed below:

steel, particularly high-strength steel, with aluminium, aluminium alloy or magnesium alloy;

metal, for example steel, aluminium, aluminium alloy or magnesium alloy, with a plastics material, in particular also a fibre-reinforced plastics material, or a composite material.

Thus, any parts, not necessarily the above-mentioned parts, can be joined together by the friction welding process. According to the present application, in particular the following parts of a motor vehicle seat can be joined together by friction welding:

backrest frame, for example made of aluminium, aluminium alloy or magnesium alloy, and seat metal fitting, for example made of a high-strength steel (cf. FIGS. 1b, 3a/3b, 7a);

seat metal fitting, for example made of a high-strength steel, and seat frame, for example made of aluminium, aluminium alloy or magnesium alloy;

backrest frame or seat frame with a crossbar (cf. FIGS. 3a, 7a);

seat frame side angle, for example made of aluminium, aluminium alloy or magnesium alloy, with a rail guide of a seat longitudinal adjustment, for example made of a high-strength steel (cf. FIG. 8);

segment or lever, in particular made of a steel, with a transverse tube held by said segment or lever, for example made of aluminium, for example a height adjustment shaft of a motor vehicle seat (cf. FIG. 4, reference numeral 12); in this case, the parts to be joined together can also be heated by rotation, for example by rotating the tube about its longitudinal axis and/or by rotating the segment or lever about an axis of rotation located in a recess for receiving the tube.

On studying the description provided above, a person skilled in the art will readily envisage further pairings of materials and parts which can be joined together by friction welding within the meaning of the present application in the motor vehicle seat sector.

Of course, the different friction welding processes mentioned above, for example multi-orbital friction welding, friction stir welding and the like can also be combined together.

The invention is particularly advantageous for the production of vehicle seats for cars, but can naturally also be used for lorries and other vehicles.

What is claimed is:

1. A vehicle seat for motor vehicles, comprising a plurality of structural or retaining parts which are joined together or to a further part in at least one joining region, wherein at least one of the joining regions is being produced by friction welding, wherein the structural or retaining parts which have been joined together consist of different materials, wherein a respective backrest frame side part is joined with a fitting for coupling with a seat frame in at least one of the joining regions or a respective seat frame side part is joined with a fitting for coupling with the backrest frame in at least one of the joining regions, wherein assembly aids are provided on the backrest frame side part and on the fitting, which assembly aids form a pair of assembly aids and engage positively in one another and are configured such that the backrest frame side part and the fitting can be moved relative to one another over a predetermined distance to carry out a friction welding process and are located in a predetermined position relative to one another by a mutual stop of the assembly aids after the conclusion of a movement phase of the friction welding process which serves to heat the portions to be joined together.

2. The vehicle seat according to claim 1, wherein the join is produced in at least one of the joining regions by a relative movement of the structural or retaining parts to be joined together.

3. The vehicle seat according to claim 2, wherein the relative movement is produced by a reciprocating movement of the structural or retaining parts to be joined together by rotating at least one of the structural or retaining parts to be joined together or by multi-orbital friction welding.

4. The vehicle seat according to claim 1, wherein the join is produced by friction stir welding in at least one of the joining regions.

5. The vehicle seat according to claim 1, wherein the join is provided for transferring torques between the structural or retaining parts to be joined together.

6. The vehicle seat according to claim 5, wherein the join is produced close to the edge or close to the area of the highest torque.

7. The vehicle seat according to claim 1, wherein at least one of the structural or retaining parts consists of aluminium, an aluminium alloy or a magnesium alloy and the respective other joining partner consists of steel or in that at least one of the structural or retaining parts consists of a fibre-reinforced plastics material and the respective other joining partner consists of aluminium, an aluminium alloy, a magnesium alloy or steel.

8. The vehicle seat according to claim 1, wherein the structural parts which have been joined together form the supporting structure of a backrest frame.

9. The vehicle seat according to claim 1, wherein the assembly aids are formed by a recess and a cross pin which engage in one another.

10. The vehicle seat according to claim 1, wherein a respective backrest frame side part is joined with an upper or a lower crossbar in at least one of the joining regions.

11. The vehicle seat according to claim 1, wherein a respective seat frame side part is joined with a seat frame side angle in at least one of the joining regions or the seat frame side angle is joined with an upper rail of a vehicle seat longitudinal adjustment in at least one of the joining regions.

12. The vehicle seat according to claim 1, wherein a connecting rod is provided with lever elements, which are mounted on both sides and are attached to the connecting rod by respective connections, as structural parts which have been joined together.

13. The vehicle seat according to claim 12, wherein the connecting rod is configured as a profiled tube with an inner profile, the inner profile also being welded to the respective lever element for joining the profiled tube with the respective lever element.

14. The vehicle seat according to claim 12, wherein the profiled tube is configured as an extruded aluminium tube or as an extruded tube consisting of an aluminium alloy.

15. The vehicle seat according to claim 1, wherein the join in at least one of the joining regions has a continuous welded seam, a regularly or irregularly interrupted welded seam or a plurality of punctiform welds.

16. The vehicle seat according to claim 1, wherein the join in at least one of the joining regions is produced with an outer cone and an inner cone.

17. A method for producing a vehicle seat for motor vehicles, comprising steps of:
providing at least two structural or retaining parts for a vehicle seat; and
joining in each case two structural or retaining parts together or to a further part in at least one joining region;
wherein:
at least one of the joining regions is being produced by friction welding, wherein the structural or retaining parts to be joined together consist of different materials; and
a respective backrest frame side part is joined with a fitting for coupling with a seat frame in at least one of the joining regions or a respective seat frame side part is joined with a fitting for coupling with the backrest frame in at least one of the joining regions, wherein provided on the backrest side part and on the fitting are assembly aids which form a pair of assembly aids and engage positively in one another and are configured such that the backrest frame side part and the fitting are moved relative to one another over a predetermined distance to carry out a friction welding process and are located in a predetermined position relative to one another by a mutual stop of the assembly aids after the conclusion of a movement phase of the friction welding process which serves to heat the portions to be joined together.

18. The method according to claim 17, wherein the join is produced in at least one of the joining regions by a relative movement of the structural or retaining parts to be joined together.

19. The method according to claim 18, wherein the relative movement takes place by a reciprocating movement of the structural or retaining parts to be joined together by rotating at least one of the structural or retaining parts to be joined together or by multi-orbital friction welding.

20. The method according to claim 17, wherein in a rotation friction welding process for joining opposing ends of parts to a respective structural part, the part with the opposing ends is rotated.

21. The method according to claim 17, wherein a respective lever element is attached to both sides of a connecting rod by respective connections, the two connections provided on both sides of the connecting rod being produced at the same time.

22. The method according to claim 21, wherein the connecting rod is configured as a profiled tube with an inner profile, the inner profile also being welded to the respective lever element for joining the profiled tube with the respective lever element.

23. The method according to claim 17, wherein the join is produced by a friction stir welding process in at least one of the joining regions.

24. The method according to claim 23, wherein in the friction stir welding process a mandrel-shaped pin as welding tool is used which is arranged between the structural or retaining parts to be joined together to produce the join in the joining region and which performs a rotating relative movement based on the structural or retaining parts.

25. The method according to claim 17, wherein a join is produced close to the edge or close to the area of the highest torque for transferring torques.

26. The method according to claim 17, wherein at least one of the structural or retaining parts consists of aluminium, an aluminium alloy or a magnesium alloy and the respective other joining partner consists of steel or in that at least one of the structural or retaining parts consists of a fibre-reinforced plastics material and the respective other joining partner consists of aluminium, an aluminium alloy, a magnesium alloy or steel.

27. The method according to claim 17, wherein the structural parts to be joined together form the supporting structure of a backrest frame.

28. The method according to claim 17, wherein the assembly aids are formed by a recess and a cross pin which engage in one another.

29. The method according to claim 17, wherein a respective backrest frame side part is joined with an upper or a lower crossbar in at least one of the joining regions.

30. The method according to claim 17, wherein a respective seat frame side part is joined with a seat frame side angle in at least one of the joining regions or the seat frame side angle is joined with an upper rail of a vehicle seat longitudinal adjustment in at least one of the joining regions.

31. The method according to claim 17, wherein a plurality of welding tools is used simultaneously to produce the join.

* * * * *